(12) United States Patent
Chen et al.

(10) Patent No.: US 12,231,366 B2
(45) Date of Patent: Feb. 18, 2025

(54) METHOD AND APPARATUS FOR SIGNAL PROCESSING

(71) Applicant: Telefonaktiebolaget LM Ericsson (publ), Stockholm (SE)

(72) Inventors: Yongqian Chen, Beijing (CN); Wei Zhou, Beijing (CN); Qiang Zhang, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 570 days.

(21) Appl. No.: 17/600,545

(22) PCT Filed: Apr. 4, 2019

(86) PCT No.: PCT/CN2019/081435
§ 371 (c)(1),
(2) Date: Sep. 30, 2021

(87) PCT Pub. No.: WO2020/199180
PCT Pub. Date: Oct. 8, 2020

(65) Prior Publication Data
US 2022/0182204 A1    Jun. 9, 2022

(51) Int. Cl.
*H04L 5/00* (2006.01)
*H04B 17/318* (2015.01)
*H04B 17/345* (2015.01)

(52) U.S. Cl.
CPC ......... *H04L 5/0051* (2013.01); *H04B 17/318* (2015.01); *H04B 17/345* (2015.01)

(58) Field of Classification Search
CPC .... H04L 5/0051; H04B 17/318; H04B 17/345
See application file for complete search history.

(56) References Cited

U.S. PATENT DOCUMENTS

| | | | |
|---|---|---|---|
| 2013/0265955 A1* | 10/2013 | Kim | H04W 72/04 370/329 |
| 2015/0249517 A1 | 9/2015 | Seo et al. | |

(Continued)

FOREIGN PATENT DOCUMENTS

| | | |
|---|---|---|
| CN | 103945447 A | 7/2014 |
| CN | 10811275 A | 6/2018 |

(Continued)

OTHER PUBLICATIONS

Intel Corporation, "R1-1800316: Remaining Issues on DM-RS," 3GPP TSG RAN WG1 Meeting AH 1801, Jan. 22-26, 2018, Vancouver, Canada, 10 pages.

(Continued)

*Primary Examiner* — Duc C Ho
(74) *Attorney, Agent, or Firm* — Withrow & Terranova, PLLC

(57) ABSTRACT

Systems and methods for signal processing are provided. The method which may be performed by a radio device comprises determining categories of reference signal resource groups available for a cell. The categories of reference signal resource groups may indicate different usage states of the reference signal resource groups in a communication scheduled for the radio device in the cell. The method further comprises performing signal processing per reference signal resource group, according to the categories of the reference signal resource groups.

15 Claims, 18 Drawing Sheets

(56) References Cited

U.S. PATENT DOCUMENTS

2015/0358104 A1* 12/2015 Ohwatari .............. H04J 11/005
                                                        370/252
2018/0278395 A1*  9/2018 Yoon .................... H04L 5/0051
2019/0342061 A1   11/2019 Kim et al.

FOREIGN PATENT DOCUMENTS

WO        2018021825 A1    2/2018
WO        2018044715 A1    3/2018
WO     WO-2019023876 A1 *  2/2019   .......... H04B 7/0404

OTHER PUBLICATIONS

International Search Report and Written Opinion for International Patent Application No. PCT/CN2019/081435, mailed Dec. 27, 2019, 9 pages.
Extended European Search Report for European Patent Application No. 19922464.3, mailed Oct. 17, 2022, 7 pages.

* cited by examiner

METHOD AND APPARATUS FOR SIGNAL PROCESSING

This application is a 35 U.S.C. § 371 national phase filing of International Application No. PCT/CN2019/081435, filed Apr. 4, 2019, the disclosure of which is incorporated herein by reference in its entirety.

FIELD OF THE INVENTION

The present disclosure generally relates to communication networks, and more specifically, to method and apparatus for signal processing.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE) and new radio (NR) networks are expected to achieve high traffic capacity and end-user data rate with lower latency. In order to meet dramatically increasing network requirements, one interesting option for communication technique development is to employ multiple-input multiple-output (MIMO) technology. A communication system supporting orthogonal frequency division multiplexing (OFDM) can enable a straightforward use of MIMO technology. However, multiple users in a MIMO OFDM system introduce inter-user interference. Thus, it is desirable to suppress interference to enhance the transmission performance.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In a wireless communication network supporting multiple antenna technology, a scheme of pilot-symbol-aided channel estimation may be adopted in the OFDM receiver design. For the co-scheduled target user equipments (UEs), the time-frequency resource positions of demodulation reference signal (DM-RS) transmissions in traffic channels may be the same or different, while the time-frequency resource positions of data transmissions are the same. In the case that the co-scheduled target UEs are assigned different DM-RS radio resource groups (or DM-RS groups for short), the interference detected from DM-RS transmission and the interference detected from data transmission may be different, which may affect the performance of an interference rejection combining (IRC) joint detection receiver. Therefore, it may be desirable to deal with the interference imbalance between DM-RS and data transmissions.

Various exemplary embodiments of the present disclosure propose a solution for signal processing, which can enable an IRC joint detection receiver to be used in an interference inconsistency system, so that the interference related to different transmissions can be detected accurately and cancelled effectively.

According to a first aspect of the present disclosure, there is provided a method performed by a radio device. The method comprises determining categories of reference signal resource groups available for a cell to indicate different usage states of the reference signal resource groups in a communication scheduled for the radio device in the cell. The method further comprises performing signal processing per reference signal resource group, according to the categories of the reference signal resource groups.

In accordance with some exemplary embodiments, the signal processing per reference signal resource group may comprise: determining a signal power parameter per reference signal resource group being used for reference signal transmission in the scheduled communication.

In accordance with some exemplary embodiments, the signal processing per reference signal resource group may further comprise: determining a minimum signal power parameter based at least in part on the determined signal power parameter.

In accordance with some exemplary embodiments, the signal processing per reference signal resource group may comprise: determining a noise power parameter per reference signal resource group being used for reference signal transmission in the scheduled communication.

In accordance with some exemplary embodiments, the signal processing per reference signal resource group may comprise: determining a received power parameter per reference signal resource group being unused for reference signal transmission in the scheduled communication.

In accordance with some exemplary embodiments, the reference signal resource groups available for the cell may comprise: a first category of reference signal resource group being used for reference signal transmission in the scheduled communication.

In accordance with some exemplary embodiments, the method according to the first aspect of the present disclosure may further comprise: calculating a parameter of interference plus noise for the scheduled communication, based at least in part on signals received over the first category of reference signal resource group.

In accordance with some exemplary embodiments, the reference signal resource groups available for the cell may further comprise: a second category of reference signal resource group being unused for reference signal transmission and data transmission in the scheduled communication.

In accordance with some exemplary embodiments, the method according to the first aspect of the present disclosure may further comprise: detecting interference related to the second category of reference signal resource group; and calculating a parameter of interference plus noise for the scheduled communication, based at least in part on signals received over the first category of reference signal resource group and the detected interference.

In accordance with some exemplary embodiments, the reference signal resource groups available for the cell may further comprise: a third category of reference signal resource group being used for data transmission in the scheduled communication.

In accordance with some exemplary embodiments, the method according to the first aspect of the present disclosure may further comprise: detecting interference related to at least one of the second category of reference signal resource group and the third category of reference signal resource group; and calculating a parameter of interference plus noise for the scheduled communication, based at least in part on signals received over the first category of reference signal resource group and the detected interference.

In accordance with some exemplary embodiments, the method according to the first aspect of the present disclosure may further comprise: performing parallel interference cancellation (PIC) in the calculation of the parameter of interference plus noise for the scheduled communication.

In accordance with some exemplary embodiments, the method according to the first aspect of the present disclosure may further comprise: determining a weight parameter of interference rejection combining (IRC) for the scheduled communication, based at least in part on the calculated parameter of interference plus noise.

In accordance with some exemplary embodiments, the radio device may comprise a network node such as a base station. Alternatively, the radio device may comprise a terminal device such as a UE.

In accordance with some exemplary embodiments, the reference signal resource groups may comprise demodulation reference signal (DM-RS) groups. Optionally, the DM-RS groups may be multiplexed in time domain and/or frequency domain.

According to a second aspect of the present disclosure, there is provided an apparatus which may be implemented as a radio device. The apparatus may comprise one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a radio device. The apparatus comprises a determining unit and a performing unit. In accordance with some exemplary embodiments, the determining unit may be operable to carry out at least the determining step of the method according to the first aspect of the present disclosure. The performing unit may be operable to carry out at least the performing step of the method according to the first aspect of the present disclosure.

According to a fifth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the first aspect of the present disclosure.

According to a sixth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the first aspect of the present disclosure.

According to a seventh aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the first aspect of the present disclosure.

According to an eighth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the first aspect of the present disclosure.

According to a ninth aspect of the present disclosure, there is provided a method implemented in a communication system which may include a host computer, a base station and a UE. The method may comprise, at the host computer, receiving user data transmitted to the base station from the UE which may perform any step of the method according to the first aspect of the present disclosure.

According to a tenth aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the first aspect of the present disclosure.

According to an eleventh aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the first aspect of the present disclosure.

According to a twelfth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the first aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
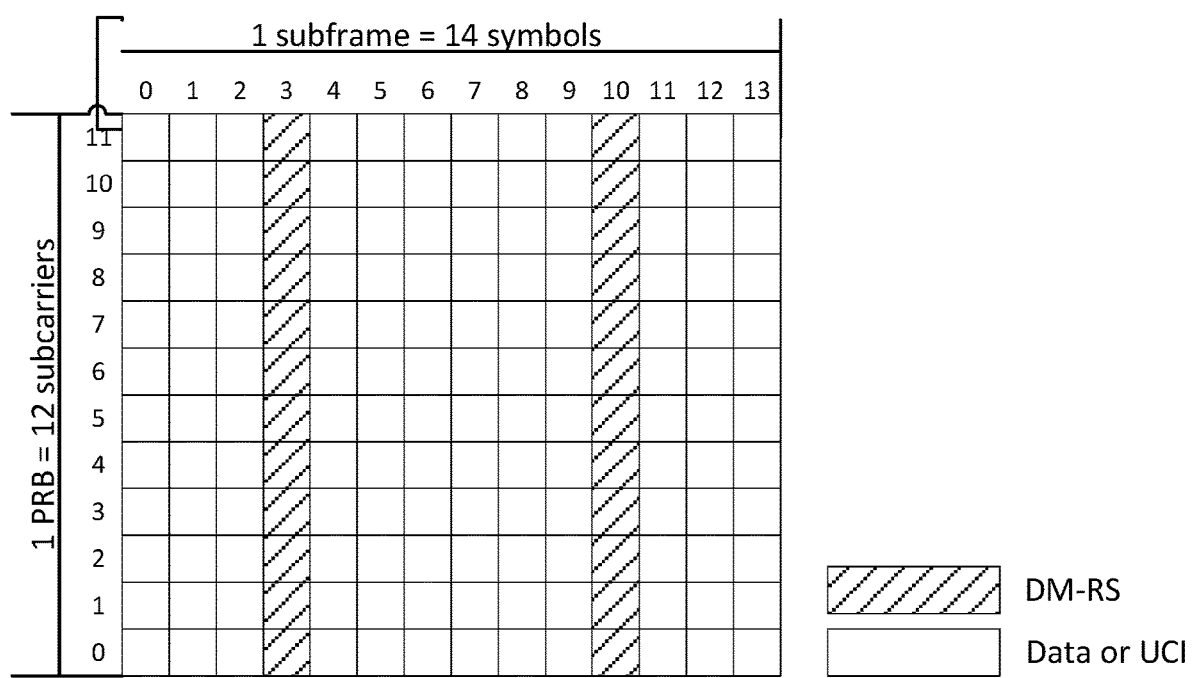
FIG. 1 is a diagram illustrating exemplary mapping of uplink reference signals according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. In the last decade, orthogonal frequency division multiplexing (OFDM) and orthogonal frequency division multiple access (OFDMA) have become the dominant physical layer technologies for providing high-data-rate services for major wideband wireless communication systems such as IEEE 802.11-based wireless local area networks (WLANs), worldwide interoperability for microwave access (WiMAX), and LTE. The next generation communication network such as 5G NR may employ cyclic OFDM (CP-OFDM) in both uplink and downlink up to at least 52.6 GHz. Having the same waveform in both directions can simplify the overall design, especially with respect to wireless backhauling and device-to-device (D2D) communications.

With increase in the carrier frequency of an OFDM system using MIMO technology, the number of antenna elements may increase in a base station as well as in terminal devices. The use of various MIMO schemes may be beneficial for enhancing spectral efficiency by enabling single-user MIMO/multi-user MIMO (SU-MIMO/MU-MIMO) and achieving greater coverage via beam-forming.

Considering the performance complexity tradeoff, a scheme of pilot-symbol-aided channel estimation is classically adopted in communication systems with OFDM receiver design. However, multiple users in a massive MIMO OFDM system may introduce inter-user interference, which needs to be mitigated by appropriate signal processing at the receiver.

In cellular communication networks such LTE and NR networks, interference rejection combining (IRC) may be used to enhance the transmission by suppressing interference. The interference mitigated by IRC may be inter-cell interference, self-interference or interference from outside the cellular communication networks. There may be a potential for IRC gain at least when the interference affects at least one signal, such as reference signal or data. IRC can use an antenna combining algorithm called minimum mean square error (MMSE) combining. Instead of selecting the antenna weights to maximize the received signal-to-noise ratio (SNR) after antenna combining, the antenna weights in IRC are selected so that the interference can be suppressed.

FIG. 1 is a diagram illustrating exemplary mapping of uplink reference signals according to an embodiment of the present disclosure. The embodiment may be applicable to an LTE scenario where an IRC receiver can be used to enhance the transmission performance. According to the DM-RS pattern design as shown in FIG. 1, the DM-RS and data (or uplink control information (UCI)) of a traffic channel such as physical uplink shared channel (PUSCH) can be mapped to the corresponding radio resources positions in the time domain and the frequency domain, e.g., symbols subcarriers. It will be appreciated that there may be other scenarios where the communication network may apply or support various radio interface technologies which are not limited to LTE technology.

In accordance with an exemplary embodiment where a MU-MIMO transmission model with $N_T$ transmit antennas is applied at each UE, $N_R$ receive antennas are applied at a base station (BS), $N_u$ co-scheduled UEs are located in a service cell and $N_I$ interfering UEs are located in a neighboring cell. The co-scheduled UEs in the service cell and the interfering UEs in the neighboring cell have the same time-frequency resources. Assuming that the number of transmitted layers from UE u is $l_u$, the total number of transmitted layers from $N_u$ target UEs and the total number of transmitted layers from $N_I$ interfering UEs can be respectively represented by $L_u$ and $L_I$ as follows:

$$L_u = \sum_{u=1}^{N_u} l_u \tag{1}$$

$$L_I = \sum_{u=1}^{N_I} l_u \tag{2}$$

The received signal of the BS can be expressed as follows:

$$Y(k) = \sum_{l=1}^{L_u+L_I} H_l(k) X_l(k) + n(k) \tag{3}$$

where $Y(k) \in C^{N_R \times 1}$ is the k-th subcarrier received signal vector of the BS, $X_l(k) \in C^{1 \times 1}$ is the k-th subcarrier transmitted signal vector of the l-th layer, $H_l(k) \in C^{N_R \times 1}$ is the k-th subcarrier channel response matrix of l-th layer, $n(k) \in C^{N_R \times 1}$ is the independent identical distribution (i.i.d.) zero mean cyclic symmetric complex Gaussian random noise vector with the covariance matrix $\sigma^2 I$.

The received signal may typically contain a mixture of received signal from the co-scheduled target UEs, received signal from interfering UEs of neighboring cells and the noise, and formula (3) can be rewritten as follows:

$$Y(k) = \sum_{i=1}^{L_u} H_i(k) X_i(k) + \sum_{j=1}^{L_I} H_j(k) X_j(k) + n(k) \tag{4}$$

where $\sum_{i=1}^{L_u} H_i(k) X_i(k)$ represents the useful signal, $\sum_{j=1}^{L_I} H_j(k) X_j(k)$ represents the interference, and $n(k)$ represents the noise.

Alternatively or additionally, formula (3) can also be rewritten as follows:

$$Y(k) = H_{user}(k) X_{user}(k) + H_{interf}(k) X_{interf}(k) + n(k) \tag{5}$$

$$H_{user}(k) = [H_1(k) H_2(k) \ldots H_{L_u}(k)] \tag{6}$$

$$H_{interf}(k) = [H_1(k) H_2(k) \ldots H_{L_I}(k)] \tag{7}$$

$$X_{user}(k) = [X_1(k) X_2(k) \ldots X_{L_u}(k)]^T \tag{8}$$

$$X_{interf}(k) = [X_1(k) X_2(k) \ldots X_{L_I}(k)]^T \tag{9}$$

where $H_{user}(k) \in C^{N_R \times L_u}$ is the channel matrix of the target UEs, $X_{user}(k) \in C^{L_u \times 1}$ is the transmitted signal vector of the target UEs, $H_{interf}(k) \in C^{N_R \times L_I}$ is the channel matrix of the interfering UEs, and $X_{interf}(k) \in C^{L_I \times 1}$ is the transmitted signal vector of the interfering UEs.

In an exemplary pilot-aided OFDMA system, assuming that $Y_{RS,u}(k) \in C^{N_R \times 1}$ is the received UE specific DM-RS vector for the co-scheduled target UE u and subcarrier k, $\hat{H}_u(k) \in C^{N_R \times l_u}$ is the estimated channel response matrix for the target UE u and subcarrier k, $X_{RS,u}(k) \in C^{l_u \times 1}$ is the transmitted DM-RS symbol (pilot) for the target UE u and subcarrier k, then the interference plus noise (IpN) $E_u(k, r_R)$ for the target UE u, subcarrier k and receiving antenna $r_R$ can be estimated as:

$$E_u(k,r_R) = Y_{RS,u}(k,r_R) - \sum_{l=1}^{l_u} \hat{H}_u(k,r_R,l) X_{RS,u}(k,l) \quad (10)$$

where $Y_{RS,u}(k, r_R)$ is the received UE specific DM-RS for the co-scheduled target UE u, subcarrier k and receiving antenna $r_R$, $\hat{H}_u(k, r_R, l)$ is the estimated channel response for the target UE u, subcarrier k, receiving antenna $r_R$ and transmitted layer l, and $X_{RS,u}(k, l)$ is the transmitted DM-RS symbol (pilot) for the target UE u, subcarrier k and transmitted layer l.

In an embodiment, the time-frequency resource positions of the target UEs' DM-RS are the same, and the received UE specific DM-RS for the respective UEs can be represented as:

$$Y_{RS,1}(k,r_R) = Y_{RS,2}(k,r_R) = \ldots = Y_{RS,(N_u+N_I)}(k,r_R) = Y_{RS}(k,r_R) \quad (11)$$

and the IpN $E_{all}(k, r_R)$ for all target UEs can be estimated as:

$$E_{all}(k,r_R) = Y_{RS}(k,r_R) - \sum_{u=1}^{N_u} \sum_{l=1}^{l_u} \hat{H}_u(k,r_R,l) X_{RS,u}(k,l) \quad (12)$$

Without loss of generality, the estimated IpN vectors $\overline{E}_{all}(n_{RB}, r_R) \in C^{N_{SC}^{RB} \times 1}$ can be defined as:

$$\overline{E}_{all}(n_{RB},r_R) = [E_{all}(n_{RB},N_{SC}^{RB},r_R) E_{all}(n_{RB} \cdot N_{SC}^{RB}+1,r_R) \ldots E_{all}((n_{RB}+1) \cdot N_{SC}^{RB}-1,r_R)]^T \quad (13)$$

where $n_{RB}$ ($n_{RB}=1, \ldots, N_{RB}$) is the $n_{RB}$-th scheduled physical resource block (PRB) for the target UEs in a slot, and $N_{SC}^{RB}$ is the number of subcarriers per resource block.

The estimated IpN matrix $\overline{E}_{all}(n_{RB}) \in C^{N_R \times N_R}$ can be defined as:

$$\overline{E}_{all}(n_{RB}) = [\overline{E}_{all}(n_{RB},1) \overline{E}_{all}(n_{RB},2) \ldots \overline{E}_{all}(n_{RB},N_R)] \quad (14)$$

The estimated IpN covariance matrix $\hat{Q}_{all}(n_{RB})$ for all target UEs and the $n_{RB}$-th scheduled PRB group can be represented as:

$$\hat{Q}_{all}(n_{RB}) = \frac{1}{N_{SC}^{RB}} (\overline{E}_{all}(n_{RB}))^H \overline{E}_{all}(n_{RB}) \quad (15)$$

where the element $\hat{Q}_{all}(n_{RB})(r_i, r_j)$ of matrix $\hat{Q}_{all}(n_{RB})$ means the IpN covariance estimation for receiving antennas $r_i$ and $r_j$:

$$\hat{Q}_{all}(n_{RB})(r_i,r_j) = (\overline{E}_{all}(n_{RB},r_i))^H \overline{E}_{all}(n_{RB},r_j) \quad (16)$$

Given the estimated channel estimation matrix $\hat{H}_{user}(k) \in C^{N_R \times L_u}$ for the target UEs, the IRC weight $W(k)_{IRC}^H$ of all target UEs can be obtained as:

$$W(k)_{IRC}^H = ((\hat{H}_{user}(k))^H (\hat{Q}_{all}(n_{RB}))^{-1} \hat{H}_{user}(k) + I)^{-1} (\hat{H}_{user}(k))^H (\hat{Q}_{all}(n_{RB}))^{-1} \quad (17)$$

or $$W(k)_{IRC}^H = (\hat{H}_{user}(k))^H (\hat{H}_{user}(k)(\hat{H}_{user}(k))^H + \hat{Q}_{all}(n_{RB}))^{-1} \quad (18)$$

where $k = n_{RB} \cdot N_{SC}^{RB}, n_{RB} \cdot N_{SC}^{RB}+1, \ldots, (n_{RB}+1) \cdot N_{SC}^{RB}-1$, and $(\hat{Q}_{all}(n_{RB}))^{-1}$ the inverse matrix of $\hat{Q}_{all}(n_{RB})$, $I \in C^{N_R \times N_R}$ is the identity matrix.

For subcarrier k, the IRC combining of all co-scheduled target UEs' joint detection can be expressed as:

$$\hat{X}_{user,data}(k) = W(k)_{IRC}^H Y_{data}(k) \quad (19)$$

where $Y_{data}(k)$ is the received frequency domain data symbol for the target UEs and subcarrier k.

In a pilot-assisted OFDMA system such as 5G/NR system, the DM-RS pattern design may be different from that in an LTE system. The NR system can only use user specific pilot signals that are pre-coded in the same way as the data transmission to reduce interference and energy consumption. The DM-RS of a NR traffic channel such as physical uplink shared channel (PUSCH) and physical downlink shared channel (PDSCH) may have two frequency mapping options referred to as DM-RS Type 1 and DM-RS Type 2. DM-RS Type 1 has a comb-based mapping pattern, meaning that any DM-RS port is mapped interleaved on every second subcarrier. Thus, the frequency density per port is 6 resource elements per symbol and per PRB, and there are 2 DM-RS groups per comb. DM-RS Type 2 has a non-comb-based mapping pattern with 3 DM-RS groups where the frequency density per port is 4 resource elements per symbol and per PRB.

FIGS. 2A-2D are diagrams illustrating frequency domain mapping patterns according to some embodiments of the present disclosure. According to the frequency domain mapping patterns as shown in FIGS. 2A-2D, the respective DM-RS groups may be mapped to the corresponding sub-carriers for DM-RS Type 1 and DM-RS Type 2. Specifically, FIG. 2A and FIG. 2C respectively show frequency domain mapping patterns of DM-RS Type 1 for single symbol configuration and double symbol configuration, and FIG. 2B and FIG. 2D respectively show frequency domain mapping patterns of DM-RS Type 2 for single symbol configuration and double symbol configuration.

In accordance with an exemplary embodiment, it is possible for both of DM-RS Type 1 and DM-RS Type 2 to utilize frequency domain code division multiplexing (CDM), defined as a length 2 orthogonal cover code (OCC) code. In the case that the single symbol DM-RS configuration is used, there may be up to 2 orthogonal ports per DM-RS group. In the case that the double symbol DM-RS configuration is used, there may be up to 4 orthogonal ports per DM-RS group. As an example, DM-RSs within one DM-RS group may be multiplexed over code division. The DM-RS groups can be assigned with different frequency radio resources.

The 5G/NR system further defines the number of DM-RS groups without data, as indicated by physical downlink control channel (PDCCH) downlink control information (DCI) format. The definition of DM-RS groups without data means that the DM-RS groups are not used to transmit the traffic data even if the radio resources of these DM-RS groups are not occupied by DM-RS transmissions.

Figure 2A:
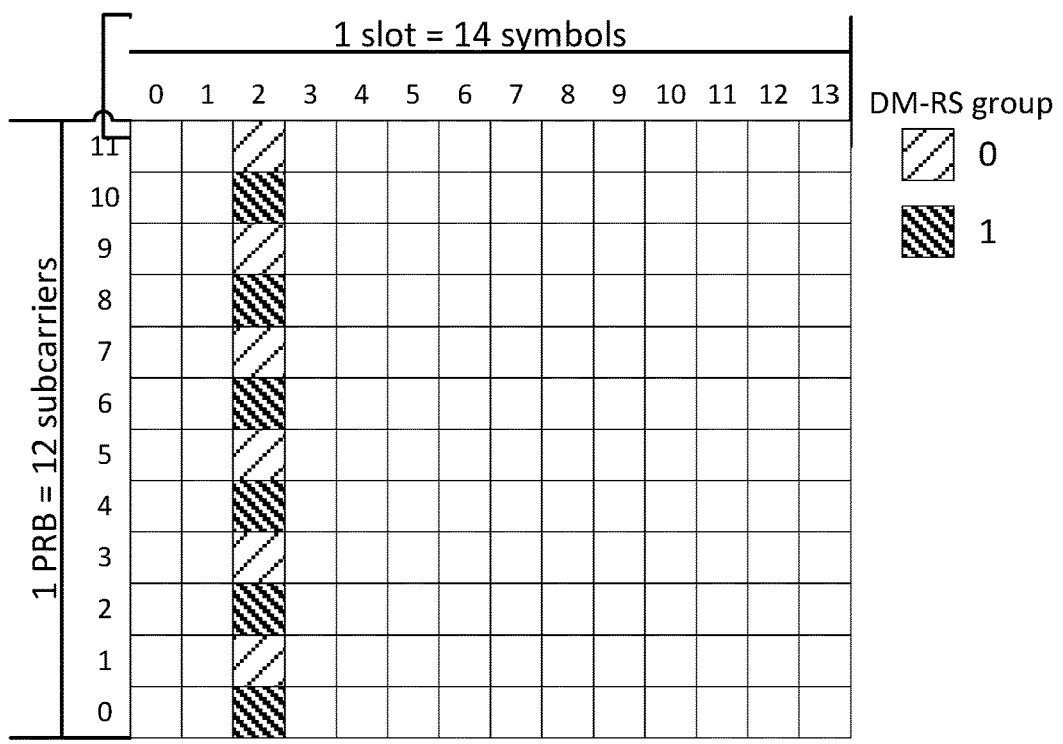
FIGS. 2A-2D are diagrams illustrating frequency domain mapping patterns according to some embodiments of the present disclosure.
Figure 2B:
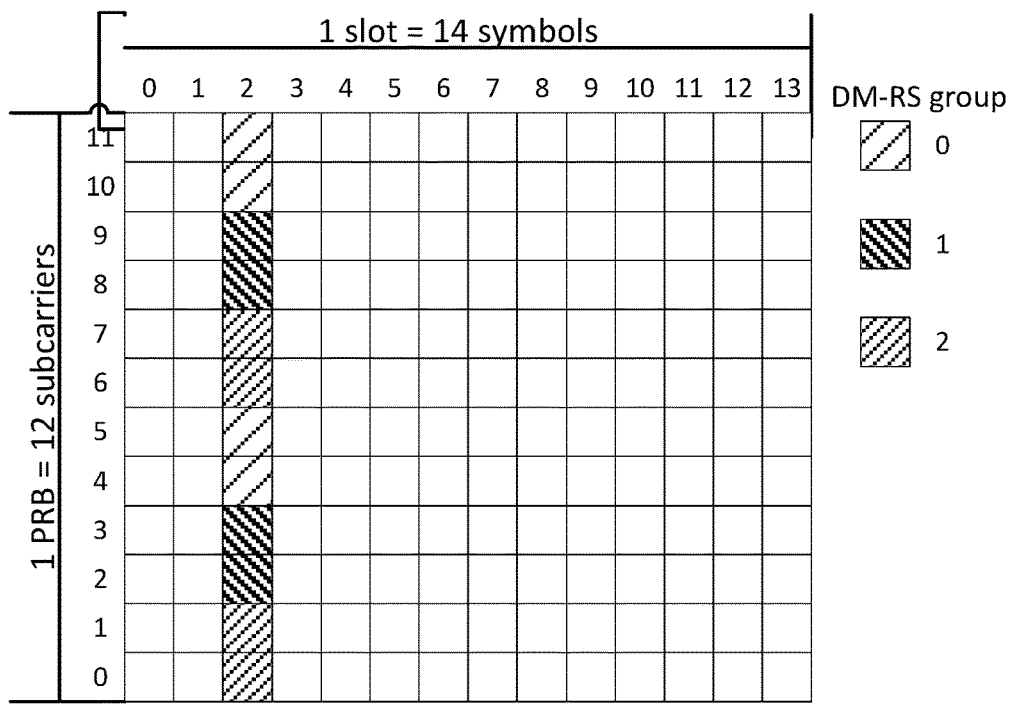
Figure 2C:
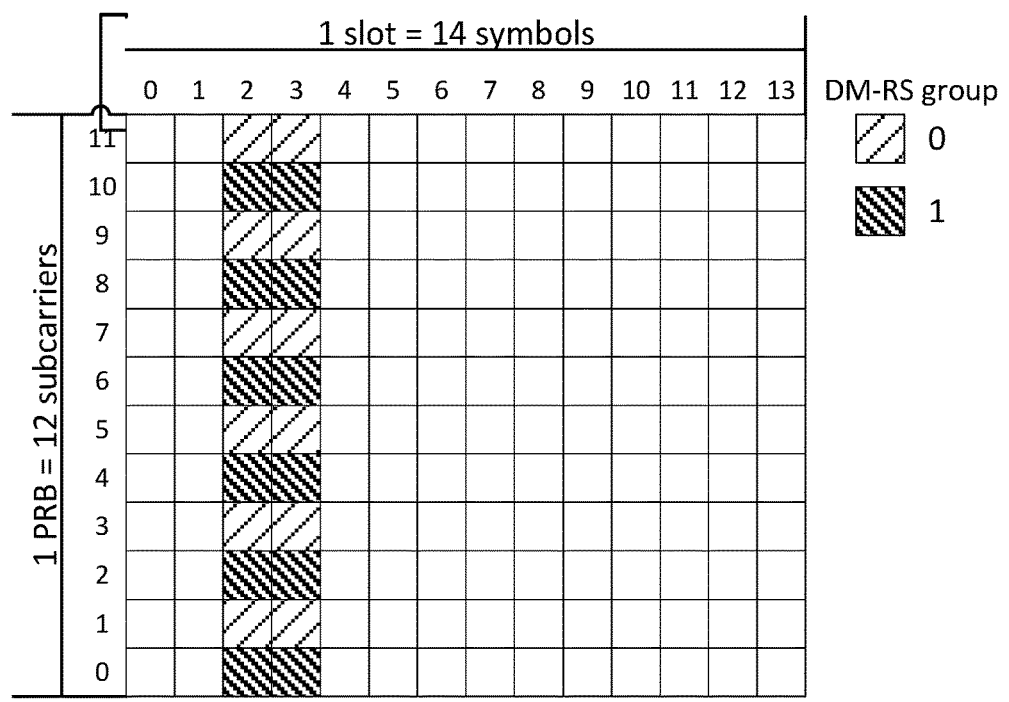
Figure 2D:
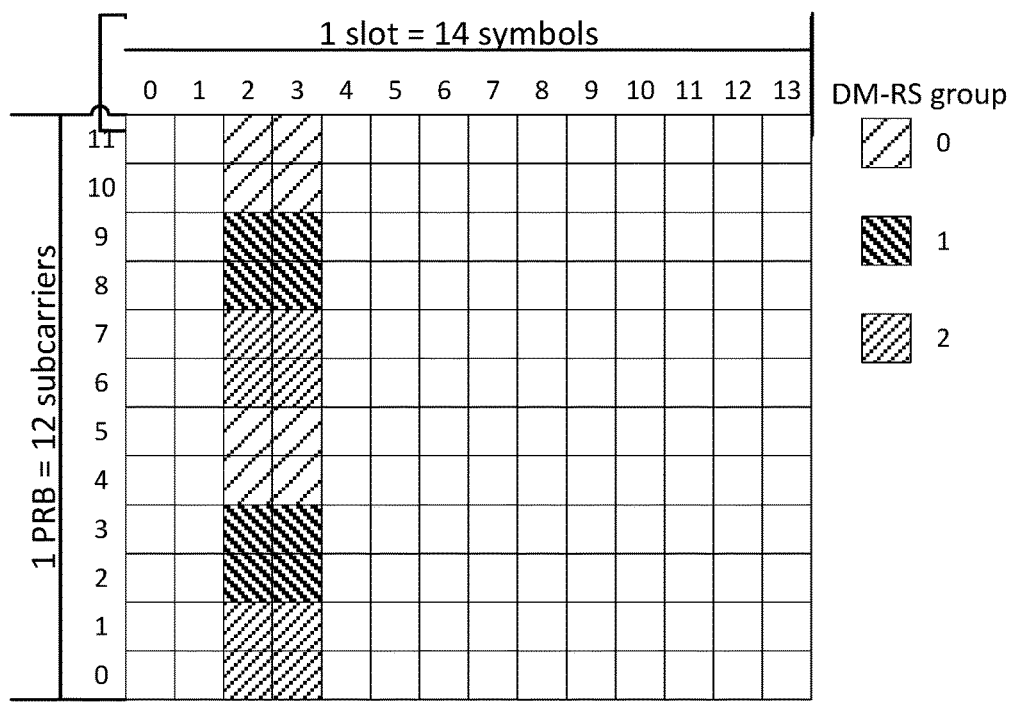

In accordance with some exemplary embodiments, different cells may have different DM-RS group configurations. For example, according to DM-RS Type 2 of resource group configuration as illustrated in FIG. 2B and FIG. 2D, the number of DM-RS groups without data for cell A may be equal to 1, and the number of DM-RS groups without data for cell B may be equal to 3. As an example, the users of cell A can transmit data in radio resources that are assigned for the second DM-RS group and the third DM-RS group.

In the case that the co-scheduled target UEs are assigned different DM-RS groups, the time-frequency resource positions of DM-RSs for the co-scheduled target UEs in NR traffic channels may be different, while the time-frequency resource positions of data for the co-scheduled target UEs are the same. Therefore, a serving network node such as gNB may receive different DM-RSs for the co-scheduled target UEs. On the other hand, the interference detected from DM-RS transmission and the interference detected from data transmission may be different. The interference imbalance between DM-RS and data transmissions may affect the receiver performance.

In order to handle the interference inconsistency in communication transmissions, the present disclosure according to some exemplary embodiments proposes to perform signal processing based on different occupancies of reference signal resource groups such as DM-RS groups, so that the interference can be detected in accordance with all possible positions of the reference signal resource groups no matter whether a reference signal resource group is actually occupied by a pilot or data of the scheduled communication. According to some exemplary embodiments, DM-RS signals received at a gNB for co-scheduled target UEs can be determined based on accumulation of the received DM-RS signals of all actual occupied DM-RS groups. The proposed solution may be used for accurate interference detection, for example, based on the DM-RS group(s) with actual DM-RS transmission, the DM-RS group(s) without DM-RS and data transmissions from co-scheduled users in the same cell, and/or the DM-RS group(s) with data transmission, so as to achieve better interference cancellation performance.

Figure 3:
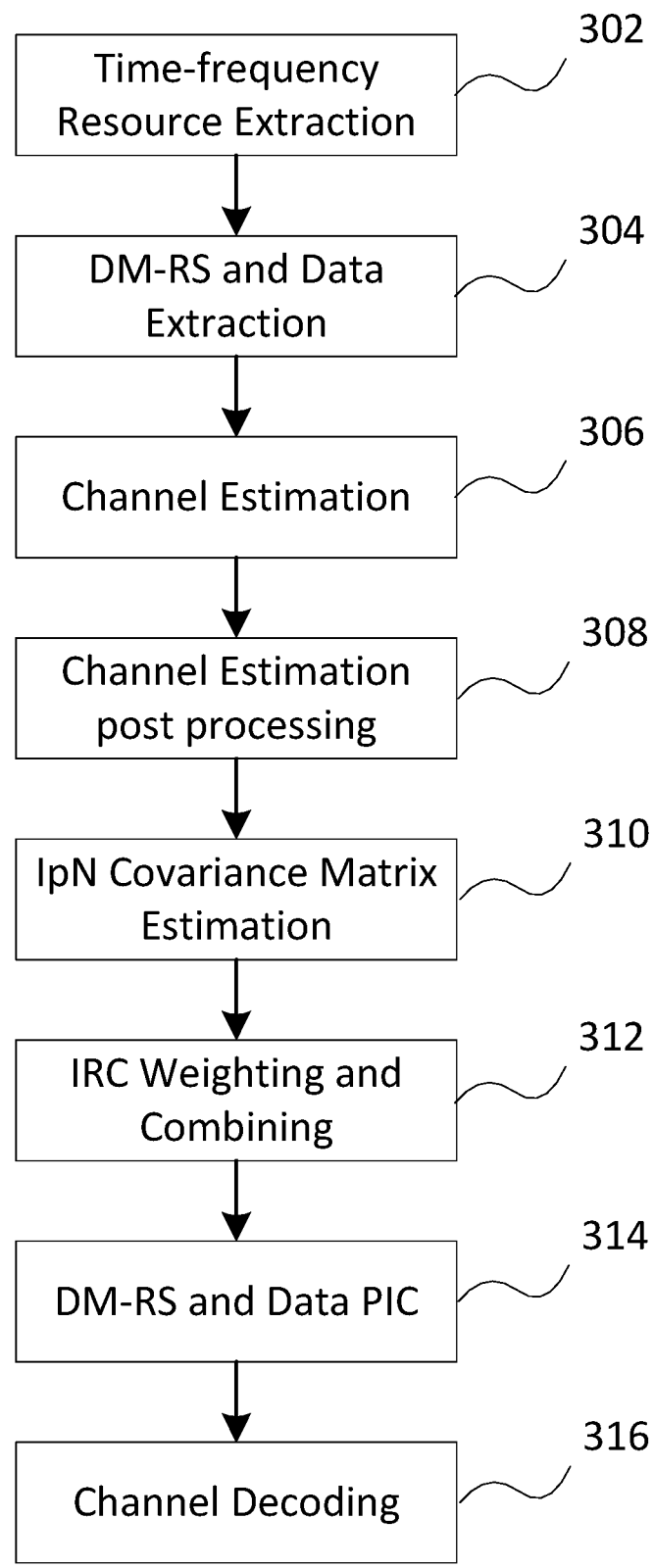
FIG. 3 is a flowchart illustrating an exemplary IRC procedure according to an embodiment of the present disclosure.

FIG. 3 is a flowchart illustrating an exemplary IRC procedure according to an embodiment of the present disclosure. The exemplary IRC procedure as shown in FIG. 3 may be applied at an IRC receiver of a radio device such as a network node to process signals for co-scheduled users. It can be appreciated that although the IRC procedure shown in FIG. 3 is mainly described with respect to the uplink signal processing at the network node such as gNB, a terminal device such as UE can also improve its IRC receiver by performing the exemplary procedure illustrated in FIG. 3.

As shown in FIG. 3, the IRC receiver can perform time-frequency resources extraction in step 302. For example, the IRC receiver can extract the scheduled time-frequency resources of different users after receiving Fast Fourier Transformation (FFT) results. Then data and DM-RS extraction can be performed in step 304, for example, for each scheduled user. For co-scheduled users, the data are the same and the DM-RS may be in different DM-RS groups. The data extraction may be performed based on the actual scheduled resources. In accordance with an exemplary embodiment, the DM-RS extraction may be performed based on the maximum number of DM-RS groups, but not on the number of DM-RS groups without data or the number of the actual occupied DM-RS groups. As illustrated in FIGS. 2A-2D, the maximum number of DM-RS groups is 2 for DM-RS Type 1 of NR PDSCH/PUSCH, and 3 for DM-RS Type 2.

According to the results of data and DM-RS extraction, the IRC receiver can perform channel estimation and channel estimation post processing in step 306 and step 308, respectively. Assuming that $G_{MAXgroup}$ is the maximum number of DM-RS groups, $G_{nodatagroup}$ is the number of DM-RS groups without data, $G_{occupiedgroup}$ is the number of the actual occupied DM-RS groups, and communication scheduling starts with the minimum DM-RS group number, then if $G_{MAXgroup} > G_{nodatagroup}$, the radio resource for DM-RS group $G_{occupiedgroup}+1, \ldots, G_{MAXgroup}$ may be occupied by data. The received signals for different DM-RS groups and subcarrier k may be represented as $Y_{RSgroup,1}(k)$, $Y_{RSgroup,2}(k), \ldots, Y_{RSgroup,G_{MAXgroup}}(k)$.

For the actual occupied DM-RS groups, any proper signal processing algorithm can be used to get the estimated channel response matrix, and calculate the total received signal power vector, the average noise power vector and the minimum received signal power. According to an exemplary embodiment, for $Y_{RSgroup,i_{group}}(k)$, $i_{group}=1, \ldots, G_{occupiedgroup}$ the estimated channel response matrix $\hat{H}_u(k) \in \mathbb{C}^{N_R \times l_u}$ for user u ($u=1, \ldots, U_{i_{group}}$) of the co-scheduled target users for which DM-RSs are in the $i_{group}$-th DM-RS group can be obtained by using any proper algorithm, where $U_{i_{group}}$ is the number of scheduled users of the $i_{group}$-th DM-RS group. The element $\hat{H}_u(k, r_R, l)$ of matrix $\hat{H}_u(k)$ is the estimated channel response for user u, subcarrier k, receiving antenna $r_R$ and transmitted layer l ($l=1, \ldots, l_u$).

For the $i_{group}$-th DM-RS group, the total received power vector $\hat{P}_{total,i_{group}} \in \mathbb{C}^{N_R \times 1}$ over the allocated subcarriers and its element $\hat{P}_{total,i_{group}}(r_R)$, the signal power vector $\hat{P}_{s,i_{group}} \in \mathbb{C}^{N_R \times 1}$ over the allocated subcarriers and its element $\hat{P}_{s,i_{group},u,l}(r_R)$, and the noise power vector $\hat{P}_{n,i_{group}} \in \mathbb{C}^{N_R \times 1}$ and its element $\hat{P}_{n,i_{group}}(r_R)$ can be obtained correspondingly. According to these power parameters for the respective DM-RS groups, the total received signal power vector $\hat{P}_s(r_R)$ and the average noise power vector $\hat{P}_n(r_R)$ for the actual occupied DM-RS groups can be calculated as:

$$\hat{P}_s(r_R) = \sum_{i_{group}=1}^{G_{occupiedgroup}} \sum_{u}^{U_{i_{group}}} \sum_{l}^{l_u} \hat{P}_{s,i_{group},u,l}(r_R) \quad (20)$$

$$\hat{P}_n(r_R) = \frac{1}{G_{occupiedgroup}} \sum_{i_{group}=1}^{G_{occupiedgroup}} \hat{P}_{n,i_{group}}(r_R) \quad (21)$$

The minimum received signal power over the actual occupied DM-RS groups can be defined as:

$$\hat{P}_{s,min} = \min_{i_{group}} \min_{u} \min_{l} \left\{ \sum_{r_R=1}^{N_R} \hat{P}_{s,i_{group},u,l}(r_R) \right\} \quad (22)$$

Alternatively or additionally, for the DM-RS groups that are not occupied for DM-RS transmissions by users of the serving cell, the total received power can be determined, for example, by using any proper signal processing algorithm. According to an exemplary embodiment, for $Y_{RSgroup,i_{group}}(k)$, $i_{group}=G_{occupiedgroup}+1, \ldots, G_{MAXgroup}$, the total received power vector $\hat{P}_{total,i_{group}} \in \mathbb{C}^{N_R \times 1}$ and its element $\hat{P}_{total,i_{group}}(r_R)$ can be obtained by using any proper algorithm. The power calculation with respect to the DM-RS groups being not occupied by users can be omitted, if all DM-RS groups are occupied for DM-RS transmissions by the users (i.e., $G_{occupiedgroup}=G_{MAXgroup}$).

According to the exemplary procedure illustrated in FIG. 3, the IRC receiver can perform IpN covariance matrix estimation in step 310, based at least in part on one or more parameters resulted from the channel estimation in step 306 and step 308. In accordance with some exemplary embodiments, for calculating the covariance matrix of the received IpN, the IpN component $E_{all}(k, r_R)$ for all target users can be estimated based on the following categories of DM-RS groups:

category A of DM-RS group mapped with actual DM-RS;
    category B of DM-RS group without DM-RS and data from co-scheduled users in the same cell; and
    category C of DM-RS group mapped with data.

Any category of DM-RS group may comprise one or more DM-RS groups. The categories of DM-RS groups can reflect occupancies or usages of the DM-RS groups by users of the serving cell. The estimation of the IpN component $E_{all}(k, r_R)$ may be dependent on different occupancies of the DM-RS groups.

FIGS. 4A-4D are diagrams illustrating exemplary DM-RS groups in different cases according to some embodiments of the present disclosure. As shown in FIGS. 4A-4D, the DM-RS groups configured to a serving cell may be occupied by DM-RS or data. Optionally, some of the DM-RS groups configured to the serving cell may not be occupied by DM-RS or data, which is marked as a null group in FIGS. 4A-4D. Similarly, there may be different occupancies or usages of the DM-RS groups configured to a neighboring cell. Correspondingly, a receiver of the serving cell can receive signals over the DM-RS groups, which may be based on signals from the serving cell and the neighboring cell. It can be realized that configurations and occupancies of DM-RS groups shown in FIGS. 4A-4D are just examples. Other suitable numbers of DM-RS groups, the associated configurations and usages may also be applicable in implementation of the proposed solution.

Figure 4A:
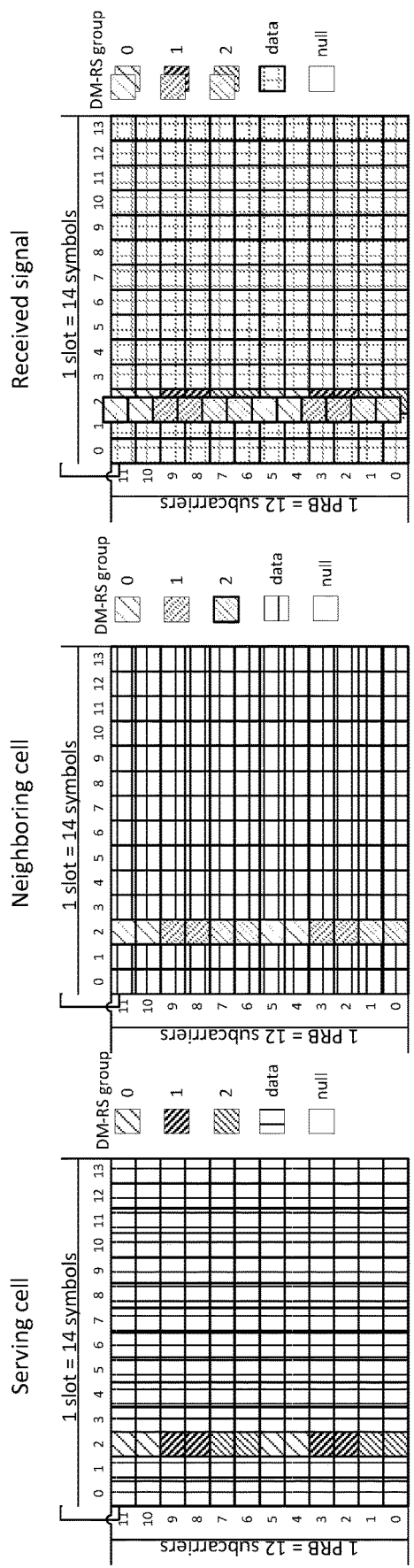
FIGS. 4A-4D are diagrams illustrating exemplary DM-RS groups in different cases according to some embodiments of the present disclosure.

In Case 1 shown in FIG. 4A, all DM-RS groups are occupied by DM-RSs of the users in the serving cell. In this case, $G_{MAXgroup}=G_{nodatagroup}$ and $G_{occupiedgroup}=G_{nodatagroup}$. All interference can be estimated based on the actual used DM-RS groups, i.e., category A of DM-RS group. The received DM-RS group signals $Y_{RS}(k, r_R)$ may consist of DM-RSs of the target users, the noise, and the interference of the neighboring cell (if any).

$$Y_{RS}(k,r_R)=\Sigma_{i_{group}=1}^{G_{occupiedgroup}} Y_{RSgroup,i_{group}}(k,r_R) \quad (23)$$

Then the IpN component $E_{all}(k, r_R)$ can be calculated as:

$$E_{all}(k,r_R)=Y_{RS}(k,r_R)-\Sigma_{u=1}^{N_u}\Sigma_{l=1}^{l_u}\hat{H}_u(k,r_R,l)X_{RS,u}(k,l) \quad (24)$$

For this case, $N_{group}=G_{occupiedgroup}$ (where $N_{group}$ is the number of the cumulative DM-RS groups), and a flag used for parallel interference cancellation (PIC) is set as $flag_{PIC}=$'false'.

Figure 4B:
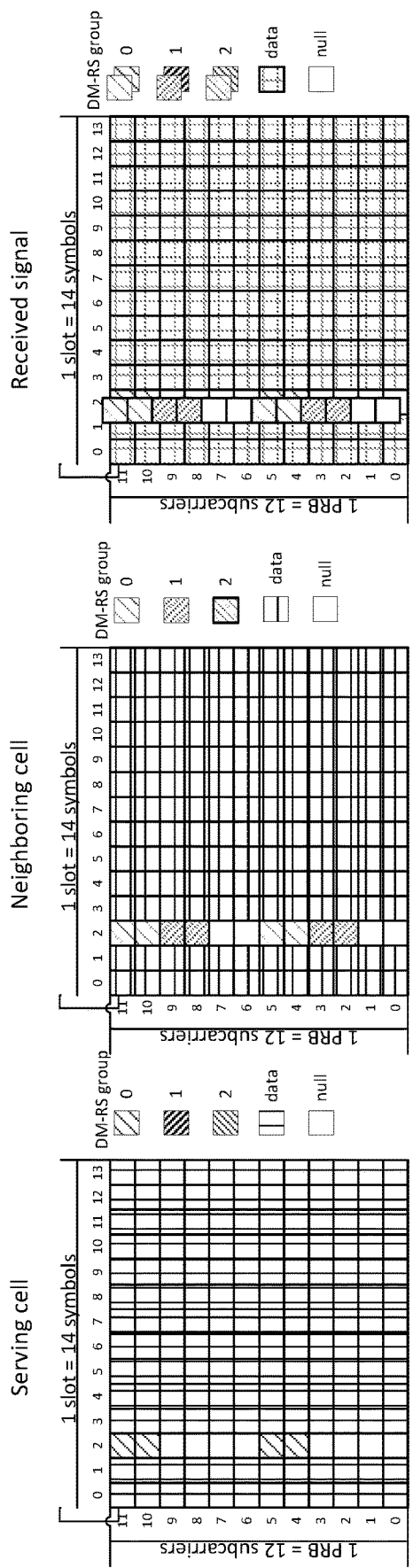

In Case 2 shown in FIG. 4B, only part of DM-RS groups is occupied by DM-RSs of the users in the serving cell, and the rest of DM-RS groups is not occupied by DM-RS and data from the serving cell. In this case, $G_{MAXgroup}=G_{nodatagroup}$ and $G_{occupiedgroup}<G_{nodatagroup}$. All interference can be estimated based on the actual used DM-RS groups and the DM-RS groups without DM-RS and data from the serving cell (if any interference exists), including category A and category B of DM-RS groups.

For category A of DM-RS group (e.g., for $i_{group}=1, \ldots, G_{occupiedgroup}$) the received DM-RS group signals may consist of DM-RSs of the target users, the noise, and the interference of the neighboring cell (if any). For category B of DM-RS group (e.g., for $i_{group}=G_{occupiedgroup}+1, \ldots, G_{nodatagroup}$), the received DM-RS group signals may consist of the noise and the interference of the neighboring cell (if any).

In accordance with an exemplary embodiment, an interference detection process may be performed for a DM-RS group without DM-RS and data from the serving cell (e.g., for DM-RS group $i_{group}=G_{occupiedgroup}+1, \ldots, G_{nodatagroup}$), which is marked as a DM-RS group with interference. The relevant received DM-RS signals $Y_{RSgroup,i_{group}}(k,r_R)$ for the DM-RS groups with interference may be accumulated into the interference $Y_{IPNgroup}(k, r_R)$ The received power for these DM-RS groups may satisfy the following condition:

$$\Sigma_{r_R=1}^{N_R}\hat{P}_{total,i_{group}}(r_R)>TH_{IPN1}\Sigma_{r_R=1}^{N_R}\hat{P}_n(r_R) \quad (25)$$

where $TH_{IPN1}$ is a predefined IpN threshold. In this case, the IpN component $E_{all}(k, r_R)$ can be calculated according to the following formulas:

$$Y_{RS}(k,r_R)=\Sigma_{i_{group}=1}^{G_{occupiedgroup}} Y_{RSgroup,i_{group}}(k,r_R)+Y_{IPNgroup}(k,r_R) \quad (26)$$

$$E_{all}(k,r_R)=Y_{RS}(k,r_R)-\Sigma_{u=1}^{N_u}\Sigma_{l=1}^{l_u}\hat{H}_u(k,r_R,l)X_{RS,u}(k,l) \quad (27)$$

For this case, $N_{group}=G_{occupiedgroup}+G_{IPNgroup}$, (where $G_{IPNgroup}$ is the number of the cumulative DM-RS groups with interference), and the flag used for PIC is set as $flag_{pic}=$'false'.

Figure 4C:
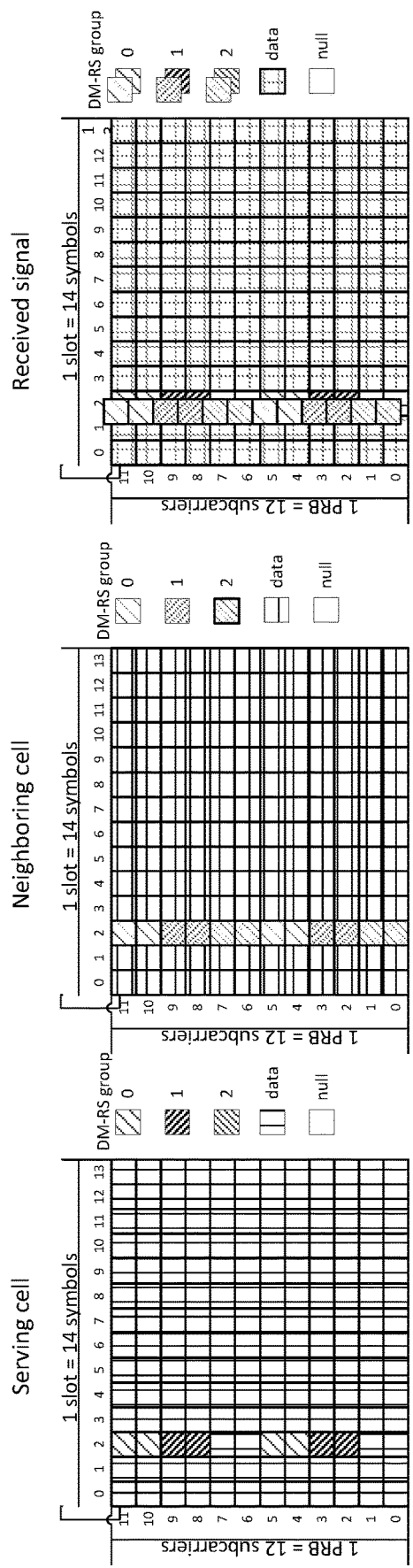

In Case 3 shown in FIG. 4C, only part of DM-RS groups is occupied by DM-RSs of the users in the serving cell, and the rest of DM-RS groups is occupied by data from the serving cell. In this case, $G_{MAXgroup}>G_{nodatagroup}$ and $G_{occupiedgroup}=G_{nodatagroup}$. All interference can be estimated based on the actual used DM-RS groups and the DM-RS groups mapping with data from the serving cell (if any interference exists), including category A and category C of DM-RS groups.

For category A of DM-RS group (e.g., for $i_{group}=1, \ldots, G_{occupiedgroup}$), the received DM-RS group signals may consist of DM-RSs of the target users, the noise, and the interference of the neighboring cell (if any). For category C of DM-RS group (e.g., for $i_{group}=G_{occupiedgroup}+1, \ldots, G_{MAXgroup}$), the received DM-RS group signals may consist of data of the target users, the noise and the interference of the neighboring cell (if any).

In accordance with an exemplary embodiment, an interference detection process may be performed for a DM-RS group mapped with data from the serving cell (e.g., for DM-RS group $i_{group}=G_{occupiedgroup}+1, \ldots, G_{MAXgroup}$), which is marked as the DM-RS group with interference and data. The index of the $i_{group}$-th DM-RS group with interference and data can be collected as {Index_data_interf, $i_{group}$} The received power for these DM-RS groups may satisfy the following condition:

$$\Sigma_{r_R}^{NR}\hat{P}_{total,i_{group}}(r_R)-\Sigma_{r_R=1}^{NR}(\hat{P}_s(r_R)+\hat{P}_n(r_R))>TH_S*\hat{P}_{s,min} \quad (28)$$

where $TH_S$ is a predefined signal threshold. In this case, the IpN component $E_{all}(k, r_R)$ can be calculated according to the following formulas:

$$Y_{RS}(k,r_R)=\Sigma_{i_{group}=1}^{G_{occupiedgroup}} Y_{RSgroup,i_{group}}(k,r_R) \quad (29)$$

$$E_{all}(k,r_R)=Y_{RS}(k,r_R)-\Sigma_{u=1}^{N_u}\Sigma_{l=1}^{l_u}\hat{H}_u(k,r_R,l)X_{RS,u}(k,l) \quad (30)$$

For this case, $N_{group}=G_{occupiedgroup}$, and the flag used for PIC is set as $flag_{PIC}=$'True' (if Index_data_interf≠ø).

Figure 4D:
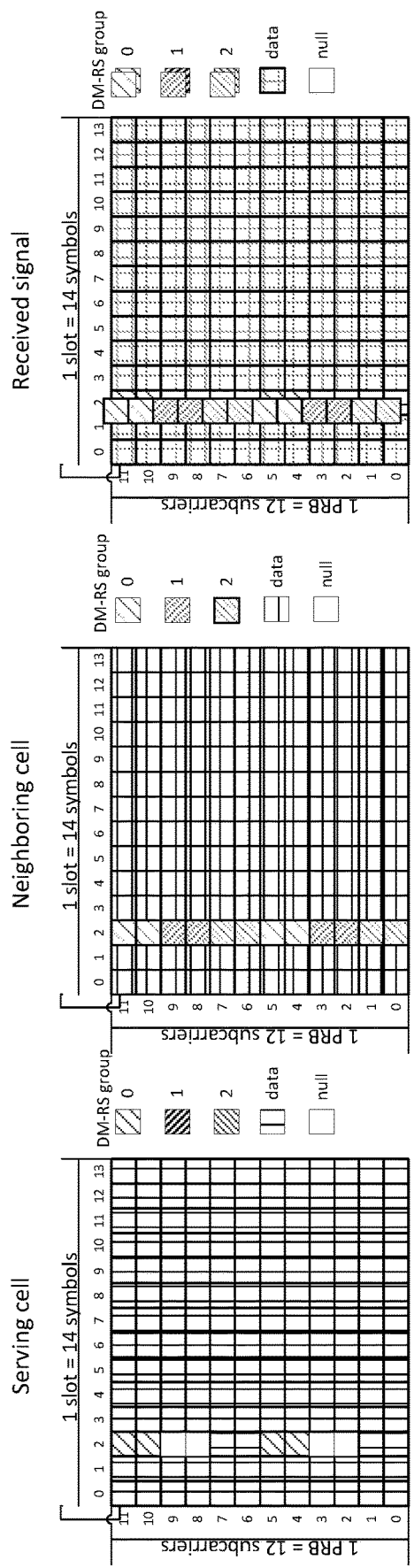

In Case 4 shown in FIG. 4D, the occupancies of DM-RS groups include all of the above cases, i.e., a first part of DM-RS groups is occupied by DM-RSs of the users in the serving cell, a second part of DM-RS groups is occupied by data from the serving cell, and the rest of DM-RS groups is not occupied by DM-RS and data from the serving cell. In this case, $G_{MAXgroup}>G_{nodatagroup}$ and $G_{occupiedgroup}<G_{nodatagroup}$. All interference can be estimated based on the actual used DM-RS groups, the DM-RS groups without DM-RS and data from the serving cell (if any interference exists) and the DM-RS groups mapping with data from the serving cell (if any interference exists), including category A, category B and category C of DM-RS groups.

For category A of DM-RS group (e.g., $i_{group}=1, \ldots, G_{occupiedgroup}$) the received DM-RS group signals may consist of DM-RSs of the target users, the noise, and the interference of the neighboring cell (if any). For category B of DM-RS group (e.g., for $i_{group}=G_{occupiedgroup}+1, \ldots,$ $G_{nodatagroup}$), the received DM-RS group signals may consist of the noise and the interference of the neighboring cell (if any). For category C of DM-RS group (e.g., for $i_{group}=G_{nodatagroup}+1, \ldots, G_{MAXgroup}$), the received DM-RS group signals may consist of data of the target users, the noise and the interference of the neighboring cell (if any).

In accordance with an exemplary embodiment, an interference detection process may be performed for the DM-RS group with interference and the DM-RS group with interference and data. For the DM-RS group with interference (e.g., for $i_{group}=G_{occupiedgroup}+1, \ldots, G_{nodatagroup}$), the relevant received DM-RS signals $Y_{RSgroup,i_{group}}(k, r_R)$ may be accumulated into the interference $Y_{IPNgroup}(k, r_R)$ The received power for these DM-RS groups may satisfy the condition in formula (25). For the DM-RS group with interference and data (e.g., for $i_{group}=G_{nodatagroup}+1, \ldots, G_{MAXgroup}$), the index of the $i_{group}$_th DM-RS group can be collected as {Index_data_interf, $i_{group}$} The received power for these DM-RS groups may satisfy the condition in formula (28).

In this case, the IpN component $E_{all}(k, r_R)$ can be calculated according to the following formulas:

$$Y_{RS}(k,r_R)=\Sigma_{i_{group}=1}^{G_{occupiedgroup}} Y_{RSgroup,group,i_{group}}(k,r_R)+Y_{IPNgroup}(k,r_R) \quad (31)$$

$$E_{all}(k,r_R)=Y_{RS}(k,r_R)-E_{u=1}^{N_u}\Sigma_{l=1}^{l_u}\hat{H}_u(k,r_R,l)X_{RS,u}(k,l) \quad (32)$$

For this case, $N_{group}=G_{occupiedgroup}=G_{IPNgroup}$, and the flag used for PIC is set as $\text{flag}_{PIC}=\text{'True'}$ (if Index_data_interf≠ø).

Based at least in part on the calculated IpN component $E_{all}(k, r_R)$, the estimated IpN covariance matrix $\hat{Q}_{all}(n_{RB})$ for the target users and PRB-group $n_{RB}$ can be given by:

$$\hat{Q}_{all}(n_{RB}) = \frac{1}{N_{SC}^{RB}}(\bar{E}_{all}(n_{RB}))^H \bar{E}_{all}(n_{RB}) - (N_{group}-1)\sum_{r_R=1}^{N_R}\hat{P}_n(r_R).I \quad (33)$$

where $I \in C^{N_R \times N_R}$ is the identity matrix.

Referring back to FIG. 3, according to the estimated IpN covariance matrix $\hat{Q}_{all}(n_{RB})$, the receiver can perform IRC weighting and combining in step 312. According to the estimated channel estimation matrix $\hat{H}_{user}(k) \in C^{N_R \times L_u}$ for the target users, for $k=n_{RB} \cdot N_{SC}^{RB}, n_{RB} \cdot N_{SC}^{RB}+1, \ldots, (n_{RB}+1) \cdot N_{SC}^{RB}-1$, the IRC weight of all target users can be calculated as:

$$W(k)_{IRC}^H=((\hat{H}_{user}(k))^H(\hat{Q}_{all}(n_{RB}))^{-1}\hat{H}_{user}(k)+I)^{-1} (\hat{H}_{user}(k))^H(\hat{Q}_{all}(n_{RB}))^{-1} \quad (34)$$

$$\text{or } W(k)_{IRC}^H=(\hat{H}_{user}(k))^H(\hat{H}_{user}(k)(\hat{H}_{user}(k))^H+\hat{Q}_{all}(n_{RB}))^{-1} \quad (35)$$

where $(\hat{Q}_{all}(n_{RB}))^{-1}$ is the inverse matrix of $\hat{Q}_{all}(n_{RB})$, and $I \in C^{N_R \times N_R}$ is the identity matrix. For subcarrier k, the IRC combining of all co-scheduled target users' joint detection can be expressed as:

$$\hat{X}_{user,data}(k)=W(k)_{IRC}^H Y_{data}(k) \quad (36)$$

where $Y_{data}(k)$ is the received frequency domain data symbol for the target users and subcarrier k.

In accordance with an exemplary embodiment, data and pilot PIC may be optionally performed by the receiver in step 314, for example, for the cases where the flag used for PIC is set as $\text{flag}_{PIC}=\text{'True'}$. This step can be skipped in the case that the flag used for PIC is set as $\text{flag}_{PIC}=\text{'false'}$. Optionally, the data and pilot PIC may be looped a pre-defined number of times. Based at least in part on the data and pilot PIC, the IpN component $E_{all}(k, r_R)$ for the DM-RS group with interference and data (e.g., for DM-RS group $i_{group} \in$ Index_data_interf) can be calculated according to the following formulas:

$$Y_{RS}(k,r_R)=\Sigma_{i_{group}=1}^{G_{occupiedgroup}} Y_{RSgroup,i_{group}}(k,r_R)+Y_{IPNgroup}(k,r_R) \quad (37)$$

$$N_{group}=G_{occupiedgroup}+G_{IPNgroup} \quad (38)$$

$$E_{all}(k,r_R)=Y_{RS}(k,r_R)-E_{u=1}^{N_u}\Sigma_{l=1}^{l_u}\hat{H}_u(k,r_R,l)X_{RS,u}(k,l) \quad (39)$$

$$Y_I(k,r_R)=Y_{Rsgroup,i_{group}}(k,r_R)-\Sigma_{u=1}^{N_u}\Sigma_l^{l_u}\hat{H}_u(k,r_R,l) \hat{X}_{user,data}(k) \quad (40)$$

where the estimated interference $Y_I(k, r_R)$ is accumulated into the interference $Y_{IPNgroup}(k, r_R)$.

Based at least in part on the calculated IpN component $E_{all}(k, r_R)$, the estimated IpN covariance matrix $\hat{Q}_{all}(N_{RB})$ for the target users and PRB-group $n_{RB}$ can be given by:

$$\hat{Q}_{all}(n_{RB}) = \frac{1}{N_{SC}^{RB}}(\bar{E}_{all}(n_{RB}))^H \bar{E}_{all}(n_{RB}) - (N_{group}-1)\sum_{r_R=1}^{N_R}\hat{P}_n(r_R).I \quad (41)$$

Based at least in part on the estimated IpN covariance matrix $\hat{Q}_{all}(n_{RB})$, the IRC weighting and combining can be performed in the procedure of data and pilot PIC, for example, according to formulas (34)-(36).

According to the results of channel estimation and IRC weighting and combining, the receiver can perform channel decoding and any other proper operations, as shown in step 316. The procedure illustrated in FIG. 3 can be used to blindly detect the complete interference in the working band, for example, including the interference from the neighboring cells and the interference from other communication system. The interference can be blindly detected without the scheduling information of DM-RSs configured to the neighboring cells. By using the procedure illustrated in FIG. 3, the receiver can estimate the spatial correlation of the received interference plus noise, and deal with the amplification of the noise power caused by the accumulation of multiple DM-RS groups. In addition, the PIC procedure is also introduced to deal with the interference between the data of the serving cell and the pilot/data of the neighboring cells.

Figure 5A:
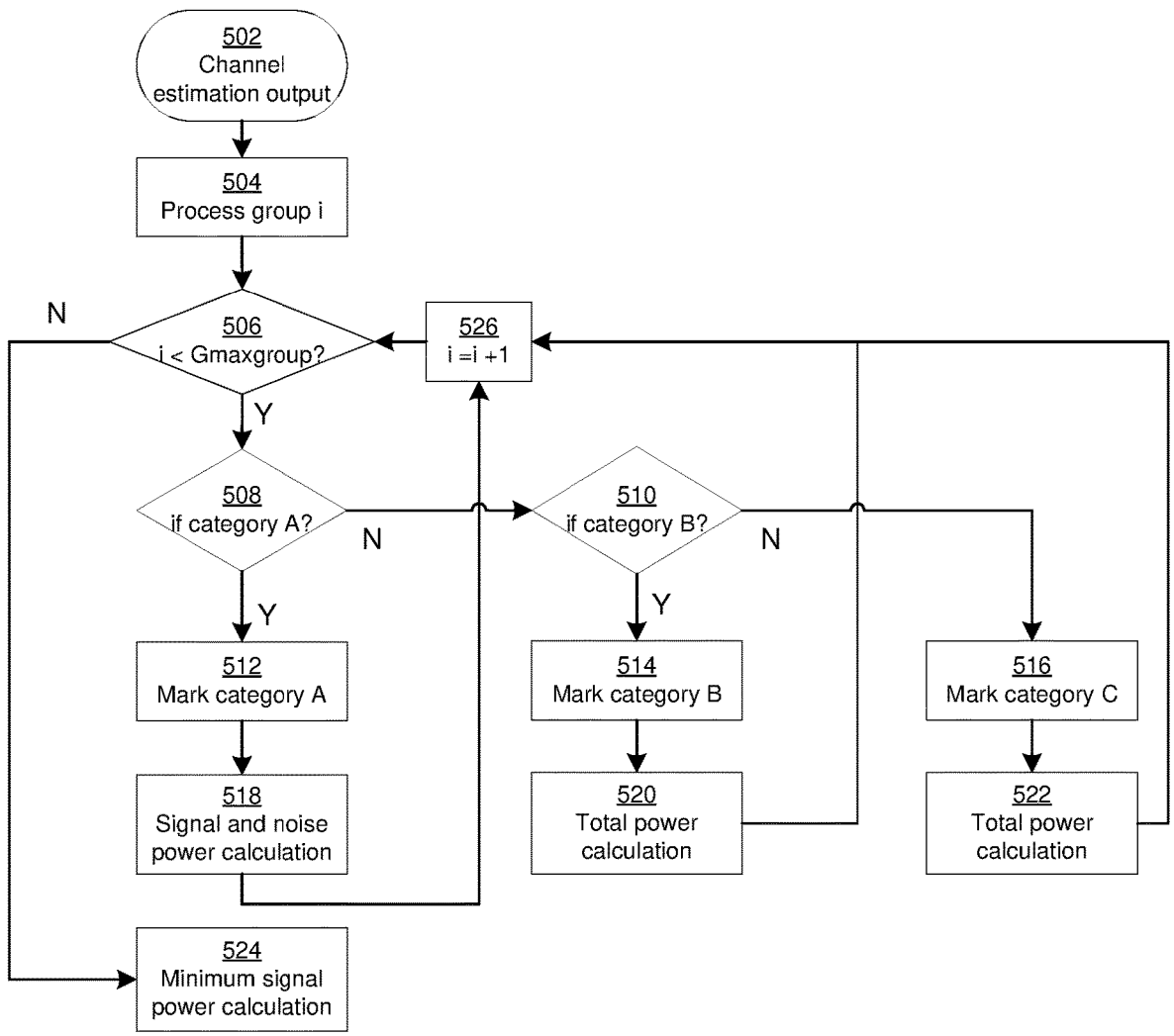
FIG. 5A is a flowchart illustrating an exemplary channel estimation post processing procedure according to an embodiment of the present disclosure.

FIG. 5A is a flowchart illustrating an exemplary channel estimation post processing procedure according to an embodiment of the present disclosure. The exemplary procedure shown in FIG. 5A may be performed by a receiver, for example, in step 308 during the IRC procedure as shown in FIG. 3. It can be appreciated that the parameter configuration and condition setting shown in FIG. 5A are just as examples, and the receiver may perform more or less alternative operations and use other suitable processing schemes according to the embodiments of the present disclosure.

According to the exemplary procedure shown in FIG. 5A, the channel estimation output from step 502 can be used by the receiver to process DM-RS group i (for i=1, 2, ..., $G_{MAXgroup}$), as shown in step 504. In the case that currently there are still one or more unprocessed DM-RS groups (i.e., "Y" branch of step 506), the receiver may determine a category of the currently processed DM-RS group. There may be three categories of DM-RS groups as described in connection with FIG. 3. If the DM-RS group is mapped with DM-RS in a serving cell (i.e., "Y" branch of step 508), the receiver can mark the DM-RS group with category A in step 512, which means that this DM-RS group is occupied or used by DM-RS transmission in the serving cell. Alternatively, if the DM-RS group is without DM-RS and data in the serving cell (i.e., "Y" branch of step 510), the receiver can mark the DM-RS group with category B in step 514, which means that this DM-RS group is not used for either DM-RS transmission or data transmission in the serving cell. Alternatively, if the DM-RS group is mapped with data in the serving cell (i.e., "N" branch of step 510), the receiver can mark the DM-RS group with category C in step 516, which means that this DM-RS group is used for data transmission in the serving cell.

For category A of DM-RS group, the receiver can perform signal and noise power calculation in step 518, for example, according to formulas (20) and (21). Then the procedure proceeds to step 526 where the number of the processed DM-RS groups is updated. For category B of DM-RS group, the receiver can perform total power calculation in step 520, for example, based on the received signal per DM-RS group. Then the procedure proceeds to step 526. Similarly, the receiver can perform total power calculation for category C of DM-RS group in step 522. Then the procedure proceeds to step 526. In the case that all the DM-RS groups configured to the serving cell are processed (i.e., "N" branch of step 506), the minimum signal power can be calculated in step 524, for example, according to formula (22). In accordance with some exemplary embodiments, the results of the channel estimation post processing in FIG. 5A can be used to estimate the covariance matrix of the received IpN for target users in the serving cell.

Figure 5B:
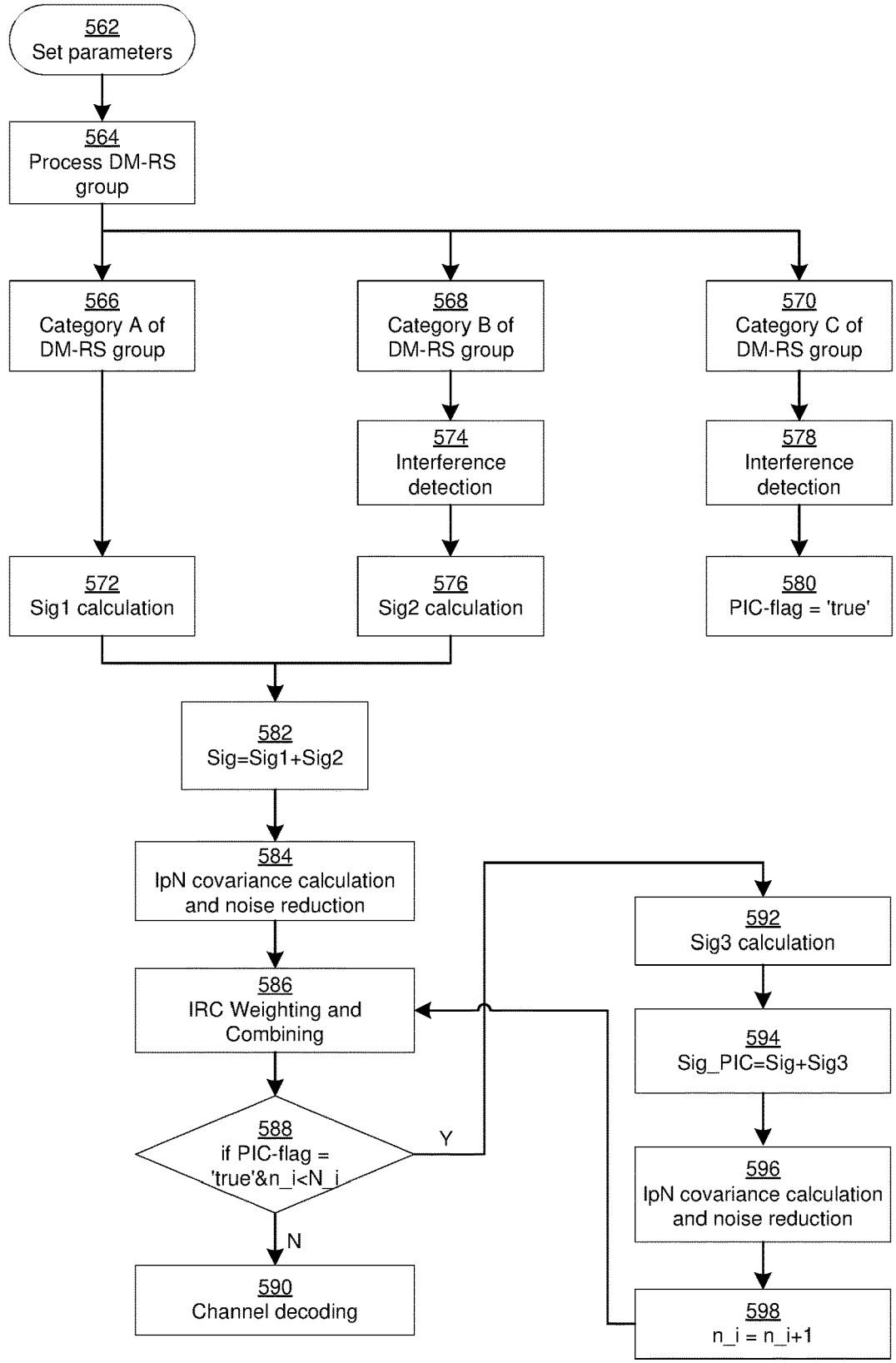
FIG. 5B is a flowchart illustrating an exemplary covariance matrix estimation procedure according to an embodiment of the present disclosure.

FIG. 5B is a flowchart illustrating an exemplary covariance matrix estimation procedure according to an embodiment of the present disclosure. The exemplary procedure shown in FIG. 5B may be performed by a receiver, for example, in step 310 during the IRC procedure as shown in FIG. 3. It can be appreciated that the parameter configuration and condition setting shown in FIG. 5B are just as examples, and more or less alternative schemes and algorithms may be applicable to the covariance matrix estimation procedure according to the embodiments of the present disclosure.

According to the exemplary procedure shown in FIG. 5B, some parameters are set or initialized in step 562. For example, the maximum number of PIC iterations is set as N_i, the number of PIC iterations completed is initialized as n_i=0, and the flag used for PIC is set as PIC_flag='false'. Then the receiver can process DM-RS groups in step 564 on the basis of their categories. Different processing approaches may be used for different categories of DM-RS groups, as shown in steps 566, 568 and 570. For category A of DM-RS group, calculation on the received DM-RS group signals (which is represented by Sig1 in FIG. 5B) can be performed in step 572, for example, according to formula (23).

In accordance with some example embodiments, category B of DM-RS group may be considered as the DM-RS group(s) with interference. Thus, interference detection with respect to category B of DM-RS group may be performed in step 574. For example, the interference can be estimated as $Y_{IPNgroup}(k, r_R)$ described in connection with case 2 shown in FIG. 4B. Then calculation on the relevant received DM-RS group signals (which is represented by Sig2 in FIG. 5B) can be performed in step 576.

In accordance with some example embodiments, category C of DM-RS group may be considered as the DM-RS group(s) with interference and data. Thus, interference detection with respect to category C of DM-RS group may be performed in step 578, for example, as described in connection with case 3 and case 4 respectively shown in FIG. 4C and FIG. 4D. Then the flag used for PIC is set as PIC_flag='true' in step 580.

Based at least in part on the signal calculations in step 572 and 576, for example, by combining the results of signal calculation (which is represented by Sig=Sig1+Sig2 in FIG. 5B) in step 582, the receiver can perform IpN covariance calculation and noise reduction in step 584, for example, according to formulas (26)-(27) and (33). Then the receiver can perform IRC weighting and combining in step 586, for example, according to formulas (34)-(36).

In the case of PIC_flag='false' (e.g., Case 1 and Case 2 described with respect to FIGS. 4A-4B) and the number n_i of PIC iterations completed is not less than N_i (i.e., "N" branch of step 588), the receiver can perform channel decoding in step 590. In the case of PIC_flag='true' (e.g., Case 3 and Case 4 described with respect to FIGS. 4C-4D) and the number n_i of PIC iterations completed is less than N_i (i.e., "Y" branch of step 588), the receiver can perform a PIC procedure to deal with the interference between the data of the serving cell and the pilot/data of neighboring cells.

In the PIC procedure, an estimated interference signal (which is represented by Sig3 in FIG. 5B) can be calculated with respect to category C of DM-RS group in step 592, for example, according to formula (40). In step 594, the receiver can use the estimated interference signal in combination with the calculated received signals in step 582, which is represented by "Sig_PIC=Sig+Sig3" in FIG. 5B, so as to further perform IpN covariance calculation and noise reduction in step 596. Then the number n_i of PIC iterations completed is updated in step 598, and the procedure proceeds to step 586.

It is noted that some embodiments of the present disclosure are mainly described in relation to 5G or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 6:
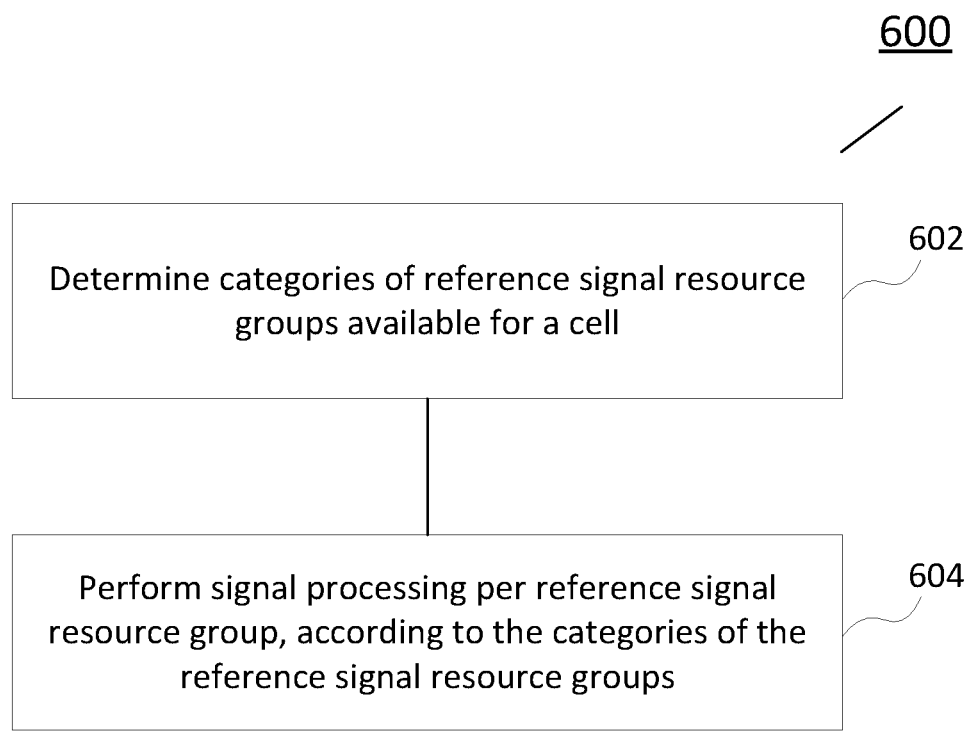
FIG. 6 is a flowchart illustrating a method according to some embodiments of the present disclosure.

FIG. 6 is a flowchart illustrating a method 600 according to some embodiments of the present disclosure. The method 600 illustrated in FIG. 6 may be performed by a radio device or an apparatus communicatively coupled to the radio device. In accordance with an exemplary embodiment, the radio device may comprise a network node such as gNB. Alternatively, the radio device may comprise a terminal device such as UE. In accordance with an exemplary embodiment, the radio device can be configured to process signals of co-scheduled users, for example, by using an IRC joint detection receiver.

According to the exemplary method 600 illustrated in FIG. 6, the radio device can determine categories of reference signal resource groups available for a cell, as shown in block 602. The categories of reference signal resource groups may indicate different usage states of the reference signal resource groups in a communication scheduled for the radio device in the cell. In accordance with some exemplary embodiments, the reference signal resource groups available for the cell may comprise the maximum number of reference signal resource groups configured to the cell (e.g., the serving cell).

In accordance with some exemplary embodiments, the reference signal resource groups may comprise DM-RS groups. Optionally, the DM-RS groups may be multiplexed in time domain and/or frequency domain. The usage state of a reference signal resource group in a communication scheduled for the radio device in the cell may comprise: using the reference signal resource group for reference signal transmission in the scheduled communication, using the reference signal resource group for data transmission in the scheduled communication, or not using the reference signal resource group for reference signal and data transmissions in the scheduled communication.

According to the exemplary method 600 illustrated in FIG. 6, the radio device can perform signal processing per reference signal resource group, according to the categories of the reference signal resource groups, as shown in block 604. In accordance with some exemplary embodiments, the signal processing per reference signal resource group may comprise: determining a signal power parameter per reference signal resource group being used for reference signal transmission in the scheduled communication. As an example, the signal power parameter may comprise a value of signal power, a vector of signal power, an indicator of signal power, or any other proper parameter related to signal power, such as $\hat{P}_{s,i_{group,u,l}}(r_R)$.

In accordance with some exemplary embodiments, the signal processing per reference signal resource group may further comprise: determining a minimum signal power parameter based at least in part on the determined signal power parameter. For example, the minimum signal power parameter may comprise a value of minimum signal power, an indicator of minimum signal power, or any other proper parameter related to minimum signal power, such as $\hat{P}_{s,min}$.

In accordance with some exemplary embodiments, the signal processing per reference signal resource group may comprise: determining a noise power parameter per reference signal resource group being used for reference signal transmission in the scheduled communication. As an example, the noise power parameter may comprise a value of noise power, a vector of noise power, an indicator of noise power, or any other proper parameter related to noise power, such as $\hat{P}_{n,i_{group}}(r_R)$.

Optionally, the signal processing per reference signal resource group may comprise: determining a received power parameter per reference signal resource group being unused for reference signal transmission in the scheduled communication. For example, the received power parameter may comprise a value of received power, a vector of received power, an indicator of received power, or any other proper parameter related to the received power, such as $\hat{P}_{total,i_{group}}(r_R)$.

In accordance with some exemplary embodiments, the reference signal resource groups available for the cell may comprise: a first category of reference signal resource group being used for reference signal transmission in the scheduled communication, such as category A of DM-RS group. In this case, the radio device can calculate a parameter of IpN for the scheduled communication, based at least in part on signals received over the first category of reference signal resource group. For example, the parameter of IpN such as $E_{all}(k, r_R)$ may be calculated according to formula (24).

Optionally, the reference signal resource groups available for the cell may further comprise: a second category of reference signal resource group being unused for reference signal transmission and data transmission in the scheduled communication, such as category B of DM-RS group. In this case, the radio device can detect interference related to the second category of reference signal resource group, such as $Y_{IPNgroup}(k, r_R)$. Based at least in part on signals received over the first category of reference signal resource group and the detected interference, the radio device can calculate a parameter of IpN for the scheduled communication. For example, the parameter of IpN such as $E_{all}(k, r_R)$ may be calculated according to formula (27).

Optionally, the reference signal resource groups available for the cell may further comprise: a third category of reference signal resource group being used for data transmission in the scheduled communication, such as category C of DM-RS group. In this case, the radio device can detect interference related to at least one of the second category of reference signal resource group and the third category of reference signal resource group, such as $Y_{IPNgroup}(k, r_R)$ Based at least in part on signals received over the first category of reference signal resource group and the detected interference, the radio device can calculate a parameter of IpN for the scheduled communication. For example, the parameter of IpN such as $E_{all}(k, r_R)$ may be calculated according to formula (30) or (32). In accordance with some exemplary embodiments, the radio device may perform PIC in the calculation of the parameter of IpN for the scheduled communication.

In accordance with some exemplary embodiments, the radio device can determine a weight parameter of IRC for the scheduled communication, based at least in part on the calculated parameter of IpN. For example, the weight parameter of IRC such as $W(k)^H_{IRC}$ may be calculated according to formula (34) or (35).

The proposed solution according to one or more exemplary embodiments can enable a radio device such as a gNB or a UE to process signals received in an interference inconsistent system, while achieving better interference cancellation performance. In accordance with some exemplary embodiments, the radio device can differentiate signal processing on different reference signal resource groups such as DM-RS groups, so as to detect the interference accurately and deal with the interference unbalance issue efficiently.

The various blocks shown in FIG. 3, FIG. 5A, FIG. 5B and FIG. 6 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 7:
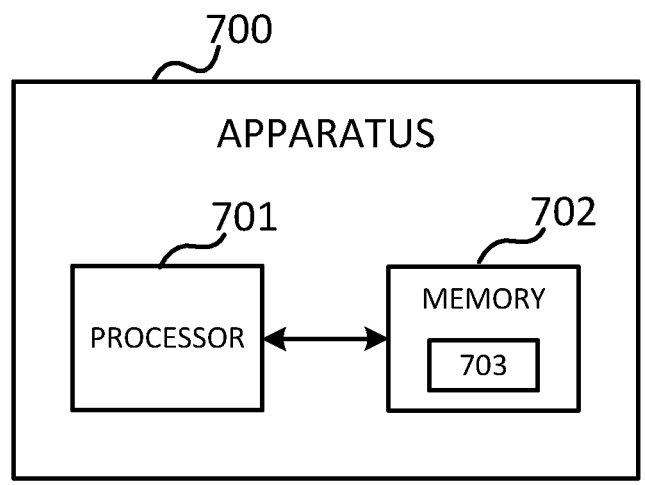
FIG. 7 is a block diagram illustrating an apparatus according to some embodiments of the present disclosure.

FIG. 7 is a block diagram illustrating an apparatus 700 according to various embodiments of the present disclosure. As shown in FIG. 7, the apparatus 700 may comprise one or more processors such as processor 701 and one or more memories such as memory 702 storing computer program codes 703. The memory 702 may be non-transitory machine/processor/computer readable storage medium. In accordance with some exemplary embodiments, the apparatus 700 may be implemented as an integrated circuit chip or module that can be plugged or installed into a radio device as described with respect to FIG. 6. In some cases, the apparatus 700 may be implemented as a radio device as described with respect to FIG. 6.

In some implementations, the one or more memories 702 and the computer program codes 703 may be configured to, with the one or more processors 701, cause the apparatus 700 at least to perform any operation of the method as described in connection with FIG. 6. Alternatively or additionally, the one or more memories 702 and the computer program codes 703 may be configured to, with the one or more processors 701, cause the apparatus 700 at least to perform more or less operations to implement the proposed methods according to the exemplary embodiments of the present disclosure.

Figure 8:
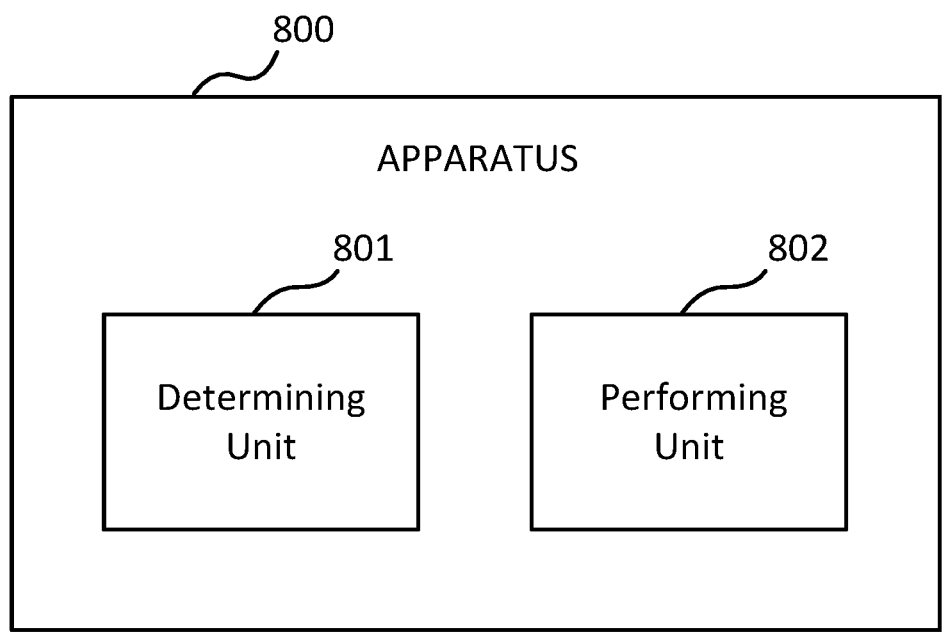
FIG. 8 is a block diagram illustrating another apparatus according to some embodiments of the present disclosure.

FIG. 8 is a block diagram illustrating an apparatus 800 according to some embodiments of the present disclosure. As shown in FIG. 8, the apparatus 800 may comprise a determining unit 801 and a performing unit 802. In an exemplary embodiment, the apparatus 800 may be implemented in a radio device such as gNB or UE. The determining unit 801 may be operable to carry out the operation in block 602, and the performing unit 802 may be operable to carry out the operation in block 604. Optionally, the determining unit 801 and/or the performing unit 802 may be operable to carry out more or less operations to implement the proposed methods according to the exemplary embodiments of the present disclosure.

Figure 9:
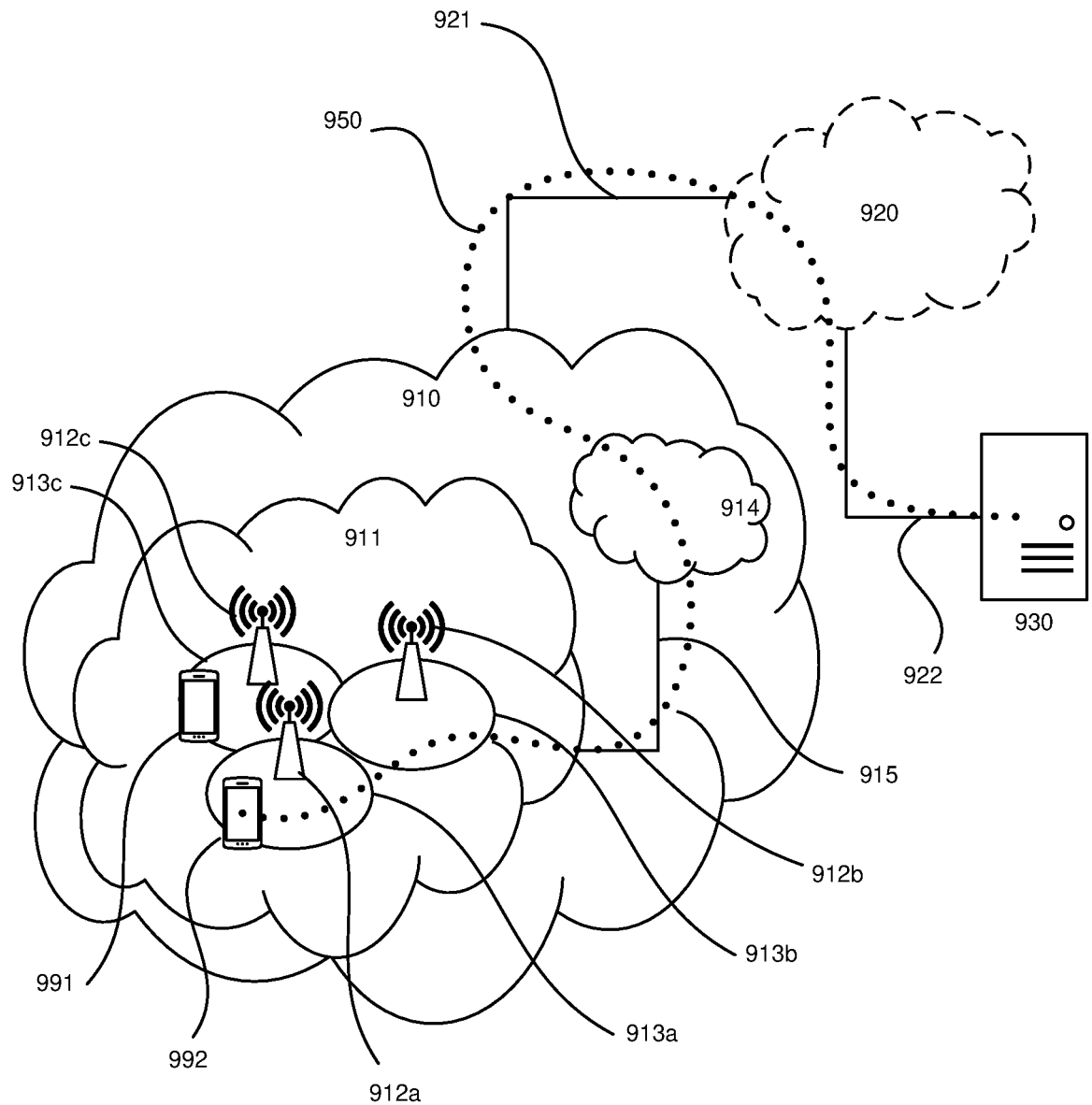
FIG. 9 is a block diagram illustrating a telecommunication network connected via an intermediate network to a host computer in accordance with some embodiments of the present disclosure.

FIG. 9 is a block diagram illustrating a telecommunication network connected via an intermediate network to a host computer in accordance with some embodiments of the present disclosure.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912*a*, 912*b*, 912*c*, such as NBs, eNBs, gNBs or other types of wireless access points, each defining a corresponding coverage area 913*a*, 913*b*, 913*c*. Each base station 912*a*, 912*b*, 912*c* is connectable to the core network 914 over a wired or wireless connection 915. A first UE 991 located in a coverage area 913*c* is configured to wirelessly connect to, or be paged by, the corresponding base station 912*c*. A second UE 992 in a coverage area 913*a* is wirelessly connectable to the corresponding base station 912*a*. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. Connections 921 and 922 between the telecommunication network 910 and the host computer 930 may extend directly from the core network 914 to the host computer 930 or may go via an optional intermediate network 920. An intermediate network 920 may be one of, or a combination of more than one of, a public, private or hosted network; the intermediate network 920, if any, may be a backbone network or the Internet; in particular, the intermediate network 920 may comprise two or more subnetworks (not shown).

The communication system of FIG. 9 as a whole enables connectivity between the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, the base station 912 may not or need not be informed about the past routing of an incoming downlink communication with data originating from the host computer 930 to be forwarded (e.g., handed over) to a connected UE 991. Similarly, the base station 912 need not be aware of the future routing of an outgoing uplink communication originating from the UE 991 towards the host computer 930.

Figure 10:
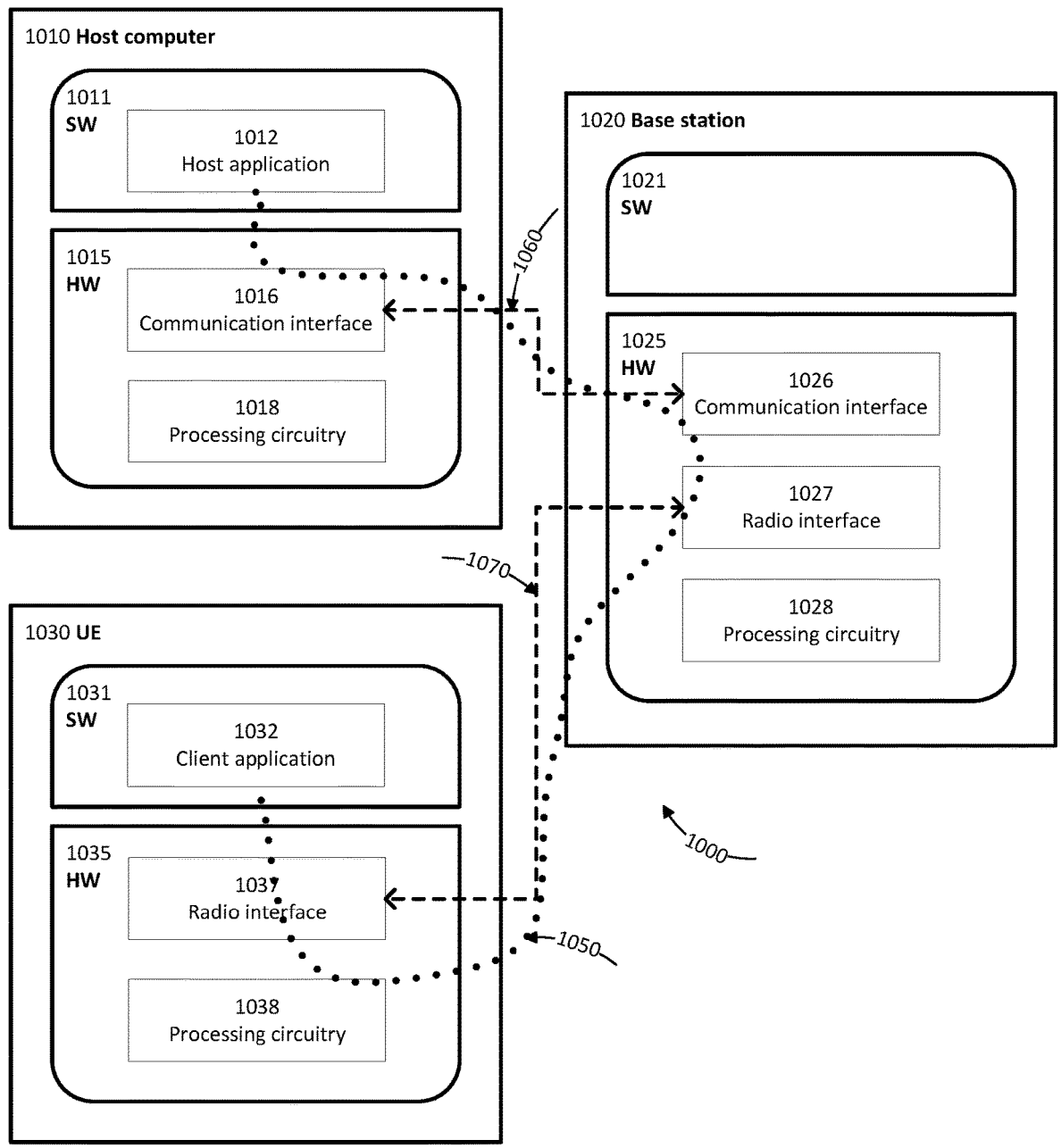
FIG. 10 is a block diagram illustrating a host computer communicating via a base station with a UE over a partially wireless connection in accordance with some embodiments of the present disclosure.

FIG. 10 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises a processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with the UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes a processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes a processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

It is noted that the host computer 1010, the base station 1020 and the UE 1030 illustrated in FIG. 10 may be similar or identical to the host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

Wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1050 between the host computer 1010 and the UE 1030, in response to variations in the measurement results. The measurement procedure and/or the network functionality for reconfiguring the OTT connection 1050 may be implemented in software 1011 and hardware 1015 of the host computer 1010 or in software 1031 and hardware 1035 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which the software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer 1010's measurements of throughput, propagation times, latency and the like. The measurements may be implemented in that the software 1011 and 1031 causes messages to be transmitted, in particular empty or 'dummy' messages, using the OTT connection 1050 while it monitors propagation times, errors etc.

Figure 11:
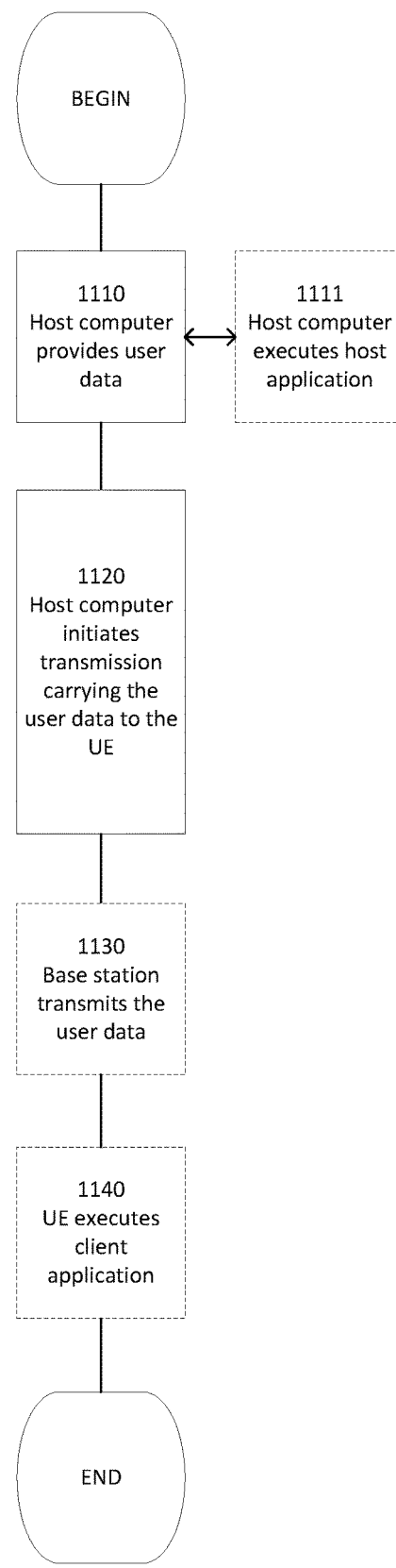
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 11 will be included in this section. In step 1110, the host computer provides user data. In sub step 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
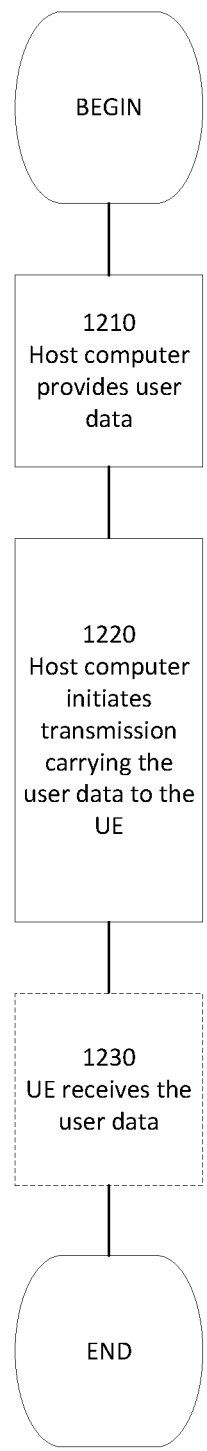
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
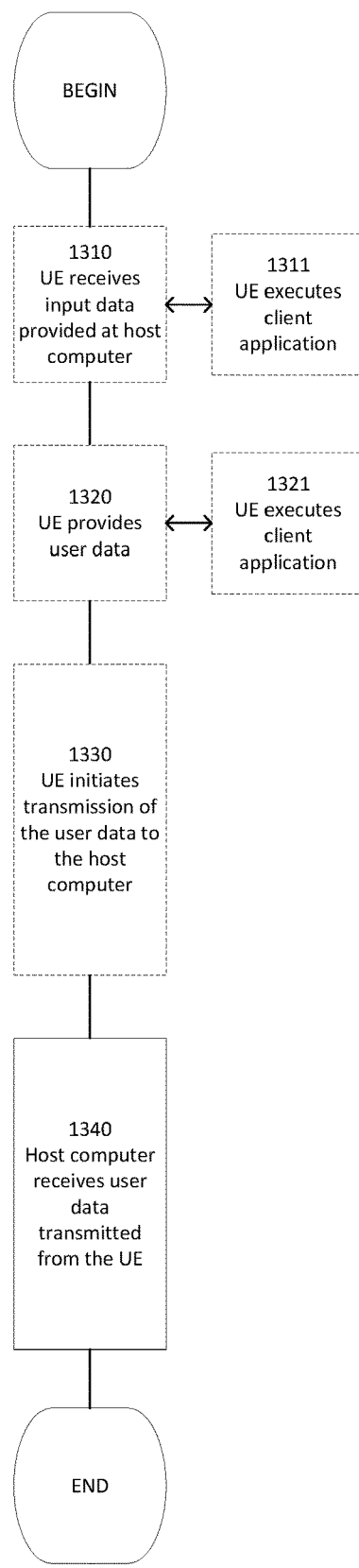
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
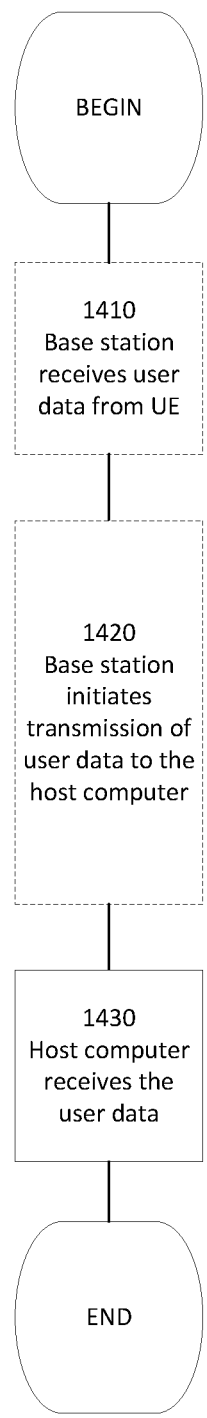
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by an interference rejection combining joint detection receiver of a radio device, comprising:
   determining categories of reference signal resource groups available for a cell to indicate different usage states of the reference signal resource groups in a communication scheduled for the radio device in the cell; and
   performing signal processing per reference signal resource group, according to the categories of the reference signal resource groups, wherein the signal processing per reference signal resource group comprises determining a signal power parameter per reference signal resource group being used for reference signal transmission in the scheduled communication to facilitate detection of interference associated with different categories of reference signal resource groups.

2. The method according to claim 1, wherein the signal processing per reference signal resource group further comprises:
   determining a minimum signal power parameter based at least in part on the determined signal power parameter.

3. The method according to claim 1, wherein the signal processing per reference signal resource group comprises:
   determining a noise power parameter per reference signal resource group being used for reference signal transmission in the scheduled communication.

4. The method according to claim 1, wherein the signal processing per reference signal resource group comprises:
   determining a received power parameter per reference signal resource group being unused for reference signal transmission in the scheduled communication.

5. The method according to claim 1, wherein the reference signal resource groups available for the cell comprise: a first category of reference signal resource group being used for reference signal transmission in the scheduled communication.

6. The method according to claim 5, further comprising:
   calculating a parameter of interference plus noise for the scheduled communication, based at least in part on signals received over the first category of reference signal resource group.

7. The method according to claim 6, further comprising:
   determining a weight parameter of interference rejection combining for the scheduled communication, based at least in part on the calculated parameter of interference plus noise.

8. The method according to claim 5, wherein the reference signal resource groups available for the cell further comprise: a second category of reference signal resource group being unused for reference signal transmission and data transmission in the scheduled communication.

9. The method according to claim 8, further comprising:
detecting interference related to the second category of reference signal resource group; and
calculating a parameter of interference plus noise for the scheduled communication, based at least in part on signals received over the first category of reference signal resource group and the detected interference.

10. The method according to claim 5, wherein the reference signal resource groups available for the cell further comprise: a third category of reference signal resource group being used for data transmission in the scheduled communication.

11. The method according to claim 10, further comprising:
detecting interference related to at least one of the second category of reference signal resource group and the third category of reference signal resource group; and
calculating a parameter of interference plus noise for the scheduled communication, based at least in part on signals received over the first category of reference signal resource group and the detected interference.

12. The method according to claim 11, further comprising:
performing parallel interference cancellation in the calculation of the parameter of interference plus noise for the scheduled communication.

13. The method according to claim 1, wherein the radio device comprises one of a network node and a terminal device.

14. The method according to claim 1, wherein the reference signal resource groups comprise demodulation reference signal groups.

15. An interference rejection combining (IRC) joint detection receiver of a radio device, comprising:
one or more processors; and
one or more memories comprising computer program codes,
the one or more memories and the computer program codes configured to, with the one or more processors, cause the IRC joint detection receiver of the radio device at least to:
determine categories of reference signal resource groups available for a cell to indicate different usage states of the reference signal resource groups in a communication scheduled for the radio device in the cell; and
perform signal processing per reference signal resource group, according to the categories of the reference signal resource groups, wherein the signal processing per reference signal resource group comprises determining a signal power parameter per reference signal resource group being used for reference signal transmission in the scheduled communication.

* * * * *